(12) United States Patent
Zhang et al.

(10) Patent No.: US 11,399,280 B2
(45) Date of Patent: Jul. 26, 2022

(54) COMMUNICATION OF NUMBERED SEQUENCE PACKETS USING OLD AND NEW CIPHER KEYS

(71) Applicant: Huawei Technologies Co., Ltd., Shenzhen (CN)

(72) Inventors: Hongping Zhang, Shanghai (CN); Le Yan, Shanghai (CN); Li Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 16/673,313

(22) Filed: Nov. 4, 2019

(65) Prior Publication Data

US 2020/0068407 A1    Feb. 27, 2020

Related U.S. Application Data

(63) Continuation of application No. PCT/CN2018/085608, filed on May 4, 2018.

(30) Foreign Application Priority Data

May 5, 2017    (CN) .......................... 201710323433.4

(51) Int. Cl.
*H04W 12/04*    (2021.01)
*H04W 28/02*    (2009.01)
(Continued)

(52) U.S. Cl.
CPC .......... *H04W 12/041* (2021.01); *H04L 47/34* (2013.01); *H04W 12/106* (2021.01);
(Continued)

(58) Field of Classification Search
CPC . H04W 12/03; H04W 12/041; H04W 12/106; H04W 28/0205; H04W 28/0252;
(Continued)

(56) References Cited

U.S. PATENT DOCUMENTS

2008/0273704 A1* 11/2008 Norrman ............... H04L 63/062
                                                                 380/278
2013/0114813 A1    5/2013 Chai
(Continued)

FOREIGN PATENT DOCUMENTS

CN         102281535 A        12/2011
CN         106537882 A         3/2017
(Continued)

*Primary Examiner* — Philip Sobutka
(74) *Attorney, Agent, or Firm* — Slater Matsil, LLP

(57) ABSTRACT

This application discloses a communications method. The method may include: receiving, by a receiving party, indication information sent by a first device, where the indication information is used to indicate at least one intermediate sequence number; receiving a data packet of the bearer sent by the first device; and skipping the at least one intermediate sequence number based on the indication information, deciphering, by using the old key, a data packet that is located on the bearer and whose sequence number is followed by the at least one intermediate sequence number, and deciphering, by using the new key, a data packet that is located on the bearer and whose sequence number follows the at least one intermediate sequence number.

20 Claims, 15 Drawing Sheets

(51) Int. Cl.
*H04L 47/34* (2022.01)
*H04W 12/041* (2021.01)
*H04W 12/106* (2021.01)
*H04W 76/27* (2018.01)
*H04W 80/02* (2009.01)

(52) U.S. Cl.
CPC ... *H04W 28/0205* (2013.01); *H04W 28/0252* (2013.01); *H04W 76/27* (2018.02); *H04W 80/02* (2013.01)

(58) Field of Classification Search
CPC ...... H04W 76/27; H04W 80/02; H04L 29/08; H04L 47/34
See application file for complete search history.

(56) References Cited

U.S. PATENT DOCUMENTS

| | | | |
|---|---|---|---|
| 2013/0195272 A1* | 8/2013 | Nagai | H04L 63/065 380/259 |
| 2013/0235742 A1 | 9/2013 | Josiam et al. | |
| 2017/0048863 A1 | 2/2017 | Tsai et al. | |
| 2017/0215225 A1 | 7/2017 | Yi et al. | |
| 2019/0394642 A1* | 12/2019 | Nakarmi | H04W 76/27 |

FOREIGN PATENT DOCUMENTS

| | | |
|---|---|---|
| CN | 107438274 A | 12/2017 |
| EP | 2003839 A1 | 12/2008 |
| WO | 2008148681 A1 | 12/2008 |
| WO | 2016021822 A1 | 2/2016 |

* cited by examiner

COMMUNICATION OF NUMBERED SEQUENCE PACKETS USING OLD AND NEW CIPHER KEYS

CROSS-REFERENCE TO RELATED APPLICATIONS

This application is a continuation of International Application No. PCT/CN2018/085608, filed on May 4, 2018, which claims priority to Chinese Patent Application No. 201710323433.4, filed on May 5, 2017. The disclosures of the aforementioned applications are hereby incorporated by reference in their entireties.

TECHNICAL FIELD

This application relates to the field of wireless communications technologies, and in particular, to a communications method, apparatus, and system.

BACKGROUND

In a mobile communications system, to ensure confidentiality of data transmission, security protection including operations such as ciphering and integrity protection needs to be performed on data transmitted through a radio air interface. In 4G and a 5G communications technology that is being formulated, a security protection function is carried out at a packet data convergence protocol (PDCP) layer. Each bearer of the air interface corresponds to an entity of a PDCP layer. As shown in FIG. 1, functions of a PDCP layer in 4G are as follows.

For a sending party, after the PDCP layer receives a data packet from an upper layer, the sending party allocates a PDCP sequence number to the data packet first, and then ciphers the data packet. For radio resource control (RRC) signaling, the sending party further performs integrity protection on the data packet before the data packet is ciphered. Then, the sending party adds a PDCP header to the ciphered data packet to generate a protocol data unit (PDU) of the PDCP layer. Finally, the sending party submits the PDCP PDU to a lower layer and sends the PDCP PDU from an air interface.

For a receiving party, after the PDCP layer receives a PDCP PDU from the lower layer, the receiving party removes a header of the PDCP PDU first and then deciphers the PDCP PDU. For RRC signaling, the receiving party deciphers the PDCP PDU and then further performs integrity check on the PDCP PDU. To ensure that data packets are sequentially submitted, if the data packets are sequential (that is, a PDCP sequence number of a current data packet is a PDCP sequence number of a previously submitted data packet plus 1), the receiving party directly submits the data packets to the upper layer; otherwise, the receiving party submits the data packets to the upper layer only after the data packets are sequential. For example, after the receiving party submits a data packet whose sequence number is 100 to the upper layer, when the receiving party receives a data packet whose sequence number is 102, the receiving party does not submit the data packet 102 because the data packet 102 is not a next data packet of the data packet 100; and only after a data packet 101 is received, the receiving party submits the data packet 101 and the data packet 102 to the upper layer.

It should be understood that when the sending party uses a key to perform ciphering, the receiving party needs to use a same key to perform deciphering. When a key of a bearer is updated, the receiving party does not know a sequence number from which a new key starts to be used by the sending party (that is, a problem of key confusion in a period). In an LTE system, a key is updated in cell handover, and the key update is always implemented through a cell handover process. That is, in the cell handover process, data transmission is interrupted, and after receiving a handover command, a terminal uses a new key; after the handover is completed, the new key is always used in data transmission, so that the sending party and the receiving party can use a consistent key to cipher and decipher a data packet. That is, the LTE system resolves the problem of key confusion in a period through transmission interruption.

SUMMARY

This application provides a communications method, apparatus, and system, to correctly decipher a data packet, effectively resolve a problem of key confusion in a period, and ensure that data transmission is not interrupted.

According to a first aspect, this application provides a communications method, applied to a sending party, and the method may include: setting, for a bearer whose key needs to be updated, a sequence number of a first data packet located on the bearer and ciphered by using a new key and a sequence number of a last data packet located on the bearer and ciphered by using an old key, to be discontinuous; and then, sending indication information to a second device (that is, a receiving party). Herein, the indication information may be used to determine at least one intermediate sequence number between the sequence number of the first data packet located on the bearer and ciphered by using the new key and the sequence number of the last data packet located on the bearer and ciphered by using the old key.

According to a second aspect, this application provides a communications method, applied to a receiving party, and the method may include: receiving the indication information sent by a first device (that is, a sending party), skipping the at least one intermediate sequence number based on the indication information, deciphering, by using the old key, a data packet that is located on the bearer and whose sequence number is followed by the at least one intermediate sequence number, and deciphering, by using the new key, a data packet that is located on the bearer and whose sequence number follows the at least one intermediate sequence number.

In this application, the bearer includes at least one of the following: a data bearer or a signaling bearer.

In this application, the at least one intermediate sequence number between the sequence number of the first data packet ciphered by using the new key and the sequence number of the last data packet ciphered by using the old key may be referred to as a "hole". That is, after the receiving party receives the indication information sent by the sending party, the receiving party may skip the "hole", decipher, by using the new key, a data packet following the "hole", and decipher, by using the old key, a data packet followed by the "hole".

It may be understood that, by implementing the communications methods described in the first aspect and the second aspect, a data packet is correctly deciphered, the problem of key confusion in a period is effectively resolved, and it is ensured that data transmission is not interrupted.

In this application, the skipping a "hole" means that, on a premise that the receiving party receives the indication information, after the first data packet ciphered by using the new key is used as a next data packet of the last data packet ciphered by using the old key and the next data packet of the last data packet is deciphered, the next data packet of the last data packet is submitted to an upper layer, even though the sequence number of the first data packet ciphered by using the new key is not equal to the sequence number of the last data packet ciphered by using the old key plus 1.

With reference to the first aspect or the second aspect, content implementation of the indication information and a transmission manner of the indication information in this application are described below:

(1) Content Implementation of the Indication Information and Specific Implementation of Skipping a "Hole".

In a first implementation, the indication information may include the sequence number of the first data packet ciphered by using the new key. For ease of description, a sequence number y may be used to indicate the sequence number of the first data packet ciphered by using the new key.

Specifically, in the first implementation, the "hole" skipped by the receiving party corresponds to a sequence number y−1 to a sequence number y−n. The receiving party may decipher a data packet whose sequence number is greater than or equal to y by using the new key, and decipher a data packet whose sequence number is less than or equal to y−n−1 by using the old key, where y and n are positive integers. Typically, n may be 1.

In a second implementation, the indication information may include the sequence number of the last data packet ciphered by using the old key. For ease of description, a sequence number x may be used to indicate the sequence number of the last data packet ciphered by using the old key.

Specifically, in the second implementation, the "hole" skipped by the receiving party corresponds to a sequence number x+1 to a sequence number x+n. The receiving party may decipher a data packet whose sequence number is greater than or equal to x+n+1 by using the new key, and decipher a data packet whose sequence number is less than or equal to x by using the old key, where x and n are positive integers. Typically, n may be 1.

In a third implementation, the indication information may include information about a sequence number corresponding to the "hole", that is, information about the at least one intermediate sequence number between the sequence number of the first data packet ciphered by using the new key and the sequence number of the last data packet ciphered by using the old key.

In the third implementation, the information about the sequence number corresponding to the "hole" may be a range [a, b] of the at least one intermediate sequence number. In this way, the "hole" skipped by the receiving party corresponds to a sequence number a to a sequence number b. The receiving party may decipher a data packet whose sequence number is greater than b by using the new key, and decipher a data packet whose sequence number is less than a by using the old key. Optionally, the information about the sequence number corresponding to the "hole" may be further the at least one intermediate sequence number, where a and b are positive integers.

In some optional embodiments, the indication information may further include: a quantity of sequence numbers included in the at least one intermediate sequence number. Optionally, the quantity of sequence numbers included in the at least one intermediate sequence number may be further a predefined value.

(2) Transmission Manner of the Indication Information

In some optional embodiments, the indication information may be carried in RRC layer signaling or a PDCP control PDU. For example, in a cell handover scenario, a base station may add the indication information to an RRC message sent to a terminal and used to trigger cell handover. The example is merely an implementation of this application, and should not constitute a limitation.

In a possible scenario, there are a plurality of bearers whose keys need to be updated. Specifically, the indication information for the plurality of bearers may be at a bearer level.

In an implementation, for the plurality of bearers, the indication information and bearer identifiers respectively corresponding to the plurality of bearers may be carried in a piece of signaling (which may be RRC layer signaling or a PDCP control PDU).

In another implementation, for the plurality of bearers, a piece of signaling may be separately sent for each bearer, that is, a plurality of pieces of signaling are sent, and the plurality of pieces of signaling may respectively carry the indication information respectively corresponding to the plurality of bearers. For example, the sending party respectively sends a PDCP control PDU through each bearer. A PDCP control PDU sent on a bearer may carry the indication information corresponding to the bearer. In addition, a PDCP control PDU sent on a bearer carries identification information of the bearer. In this way, after the receiving party receives a PDCP control PDU, the receiving party may directly know a bearer corresponding to the indication information carried in the PDCP control PDU, and the bearer corresponding to the indication information does not need to be additionally indicated, so that signaling overheads may be decreased.

Optionally, in the cell handover scenario, the indication information may be sent to the terminal through a source base station, or sent to the terminal through a target base station, or sent to the terminal through the source base station and the target base station.

Optionally, in a dual-connectivity or multi-connectivity scenario, the indication information may be sent to the terminal through a plurality of serving base stations (for example, a MeNB and an SeNB), so that it may be ensured that the terminal receives the indication information as early as possible.

With reference to the first aspect or the second aspect, in some optional embodiments, for a received data packet, the receiving party (that is, the second device) may decipher the received data packet first. After receiving the indication information, the receiving party determines whether a key previously used to decipher the data packet is correct; and if the key is incorrect, the receiving party deciphers the data packet again by using a correct key. In this way, a case in which a large quantity of data packets need to be deciphered at the same time may be avoided. Some possible implementations may include:

A first implementation: a data packet of the bearer from the second device is deciphered by using an old key. The implementation is more applicable to a situation in which the second device has not obtained a new key. For example, it is assumed that the second device is a terminal, and the first device is a base station. When the terminal has not received an RRC message sent by the base station and used to trigger key change, the terminal may decipher the received data packet by using the old key.

In the first implementation, after receiving the indication information, the second device may determine, based on the indication information, whether the data packet deciphered by using the old key has been correctly deciphered; and if the data packet is incorrectly deciphered, decipher the incorrectly deciphered data packet again by using the new key.

A second implementation: a data packet of the bearer from the second device is deciphered by using a new key. The implementation is more applicable to a situation in which the second device has obtained the new key. For example, it is assumed that the second device is a terminal, and the first device is a base station. After the terminal receives an RRC message sent by the base station and used to trigger key change, the terminal may decipher the received data packet by using the new key. The example is merely used to explain this application, and should not constitute a limitation.

In the second implementation, after receiving the indication information, the second device may determine, based on the indication information, whether the data packet deciphered by using the new key has been correctly deciphered; and if the data packet is incorrectly deciphered, decipher the incorrectly deciphered data packet again by using the old key.

It should be noted that, in the foregoing two implementations, whether the second device deciphers a data packet first by using the new key or the old key is not limited to policies mentioned in the foregoing two implementations, there may be further a different implementation in actual application, and this should not constitute a limitation.

With reference to the first aspect or the second aspect, in some optional embodiments, after receiving data packets, the second device may first determine whether the data packets are sequential; and only if the data packets are sequential, the second device deciphers the data packets, other than deciphers the data packets first. In this way, unnecessary deciphering may be decreased. It should be noted that, in this application, after receiving the indication information, the second device may skip the "hole", and consider that the first data packet ciphered by using the new key and the last data packet ciphered by using the old key are sequential.

With reference to the first aspect or the second aspect, in some optional embodiments, a trigger condition for triggering update of the key of the bearer may include at least one of the following: a key of a serving base station corresponding to the bearer is changed, a cell corresponding to the bearer is handed over, or the bearer is reconfigured. The trigger condition is not limited to the trigger conditions, and in actual application, there are also other trigger conditions capable of triggering update of the key of the bearer. Specifically, once the trigger conditions occur, the sending party (that is, the first device) may send the indication information to the receiving party (the second device), to instruct the receiving party to skip a "hole", decipher, by using the new key, a data packet following the "hole", and decipher, by using the old key, a data packet followed by the "hole".

According to a third aspect, this application provides a communications apparatus. The apparatus may include a plurality of functional modules, configured to correspondingly perform the method provided in the first aspect or the method provided in any one of possible implementations of the first aspect.

According to a fourth aspect, this application provides a communications apparatus. The apparatus may include a plurality of functional modules, configured to correspondingly perform the method provided in the second aspect or the method provided in any one of possible implementations of the second aspect.

According to a fifth aspect, this application provides a communications apparatus, configured to perform the method described in the first aspect. The communications apparatus may include: a memory, a processor coupled to the memory, and a transceiver, where the transceiver is configured to communicate with another communications device. The memory is configured to store implementation code of the method described the first aspect, and the processor is configured to execute program code stored in the memory, that is, perform the method provided in the first aspect or the method provided in any one of possible implementations of the first aspect.

According to a sixth aspect, this application provides a communications apparatus, configured to perform the method described in the second aspect. The communications apparatus may include: a memory, a processor coupled to the memory, and a transceiver, where the transceiver is configured to communicate with another communications device. The memory is configured to store implementation code of the method described the second aspect, and the processor is configured to execute program code stored in the memory, that is, perform the method provided in the second aspect or the method provided in any one of possible implementations of the second aspect.

According to a seventh aspect, this application provides a wireless communications system, including a first device and a second device, where the first device may be configured to perform the communications method provided in the first aspect or the communications method provided in any one of possible implementations of the first aspect. The second device may be configured to perform the communications method provided in the second aspect or the communications method provided in any one of possible implementations of the second aspect.

According to an eighth aspect, a computer-readable storage medium is provided. An instruction is stored in the readable storage medium. When the instruction is run, a computer may implement the communications method provided in the first aspect or the communications method provided in any one of possible implementations of the first aspect.

According to a ninth aspect, a computer-readable storage medium is provided. An instruction is stored in the readable storage medium. When the instruction is run, a computer may implement the communications method provided in the second aspect or the communications method provided in any one of possible implementations of the second aspect.

BRIEF DESCRIPTION OF THE DRAWINGS

To describe the technical solutions in the embodiments of this application or in the background more clearly, the following briefly describes the accompanying drawings required for describing the embodiments of this application or the background.

DETAILED DESCRIPTION OF ILLUSTRATIVE EMBODIMENTS

Terms used in implementations of this application are merely intended to explain specific embodiments of this application other than limit this application.

Figure 1:
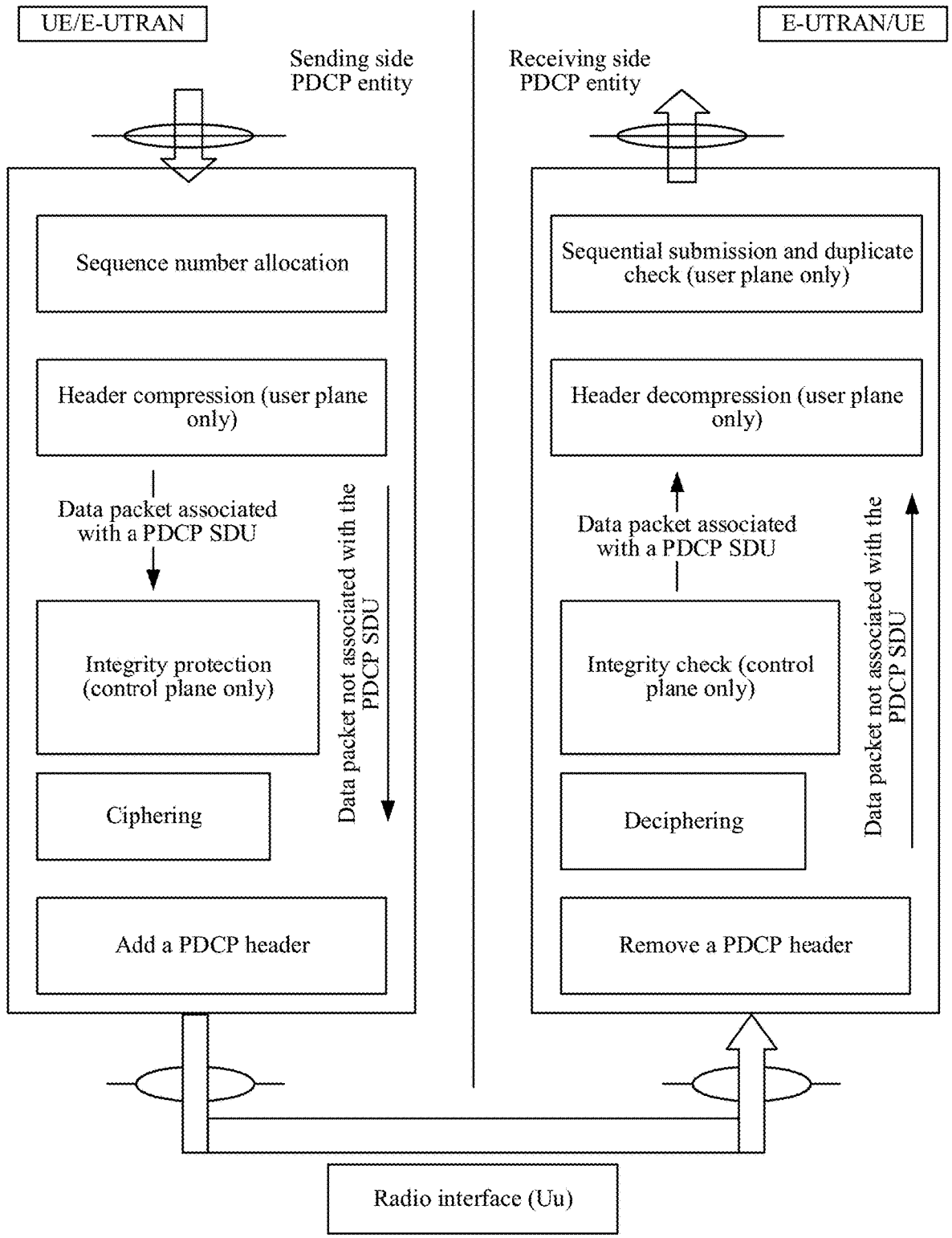
FIG. 1 is a functional block diagram of a PDCP layer of a receive end and a transmit end in LTE.
Figure 2:
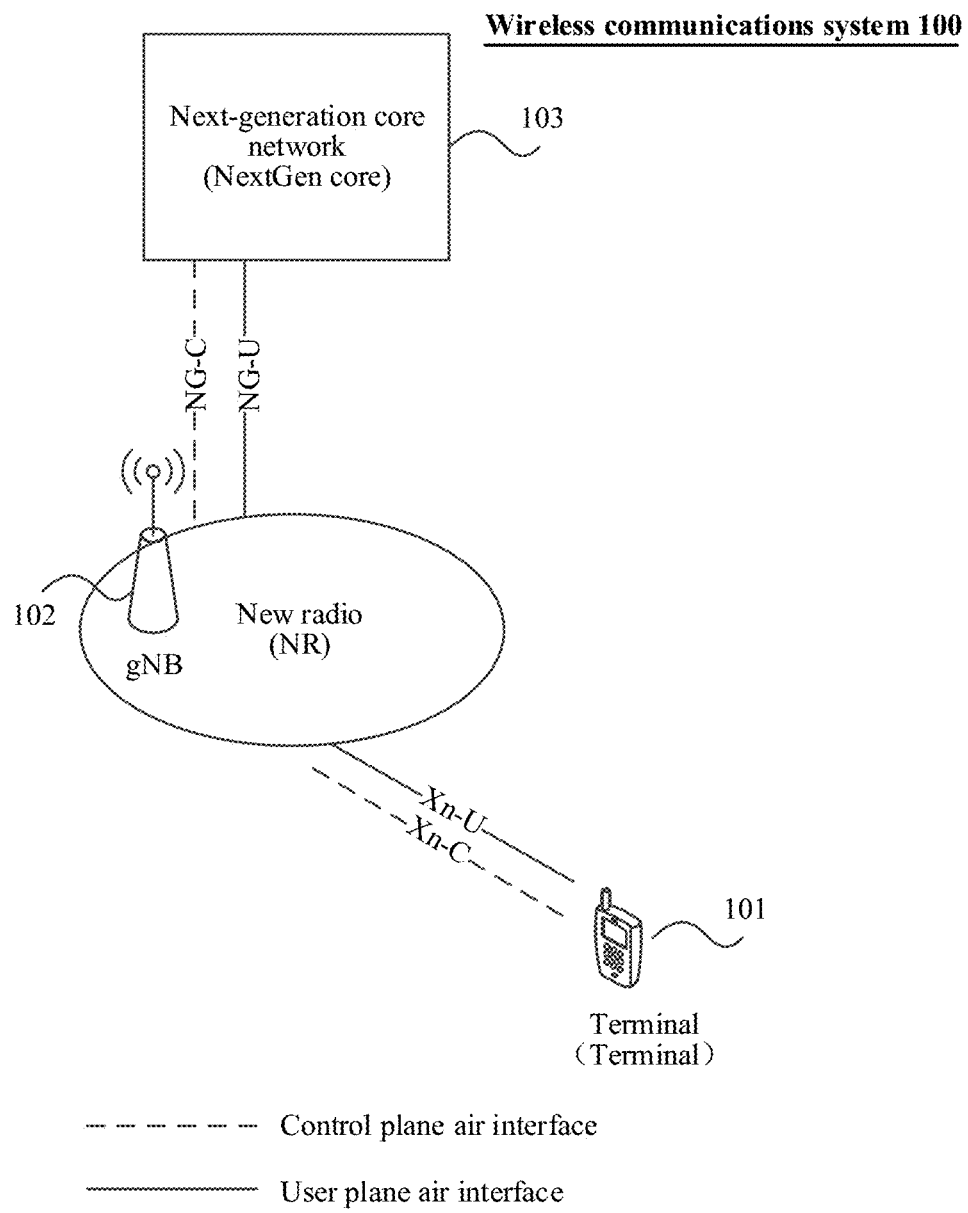
FIG. 2 is a schematic networking diagram of a wireless communications system related to this application.

FIG. 2 shows a wireless communications system related to this application. The wireless communications system may be a future evolved fifth-generation mobile communications (5G) system, a new radio (NR) system, a long term evolution (LTE) system, a machine-to-machine communications (M2M) system, or the like. As shown in FIG. 2, the wireless communications system 100 may include: one or more terminals 101, one or more network devices 102, and a core network 103.

The terminals 101 may be distributed in the whole wireless communications system 100, and may be static or moving. Specifically, the terminal 101 may be a mobile device, a mobile station, a mobile unit, an M2M terminal, a wireless unit, a remote unit, a user agent, a mobile client, or the like.

The network device 102 may be a base station, and may be configured to communicate with one or more terminals, or may be configured to communicate with one or more base stations having some functions of a terminal (for example, communication between a macro evolved NodeB and a pico evolved NodeB such as an access point). The network device 102 may be a next generation NodeB (gNB) in a future 5G system or a new radio (NR) system, an evolved NodeB (eNB) in an LTE system, a base transceiver station (BTS) in a time division synchronous code division multiple access (TD-SCDMA) system, or the like. In addition, the network device 102 may be further an access point (AP), a transit node (Trans TRP), a central unit (CU), or another network entity, and may include some or all of functions of the foregoing network entities.

The core network 103 may be a core network (NextGen core) in a future 5G system or a new radio (NR) system, an evolved packet core (EPC) network in an LTE system, a core network in a TD-SCDMA system, or the like.

As shown in FIG. 2, the network device 102 may be a next generation NodeB (gNB) in the new radio (NR) system, and the core network 103 may be a core network (NextGen core) in the new radio (NR) system. The terminal 101 may access the core network (NextGen core) through the next generation NodeB (gNB). Optionally, in the wireless communications system 100, the network device 102 may be further an evolved NodeB (eNB) in the LTE system, and the core network 103 may be further the core network (NextGen core) in the new radio (NR) system. That is, the terminal 101 may access the core network (NextGen core) in the new radio (NR) system through the evolved NodeB (eNB) in the LTE system.

Figure 3:
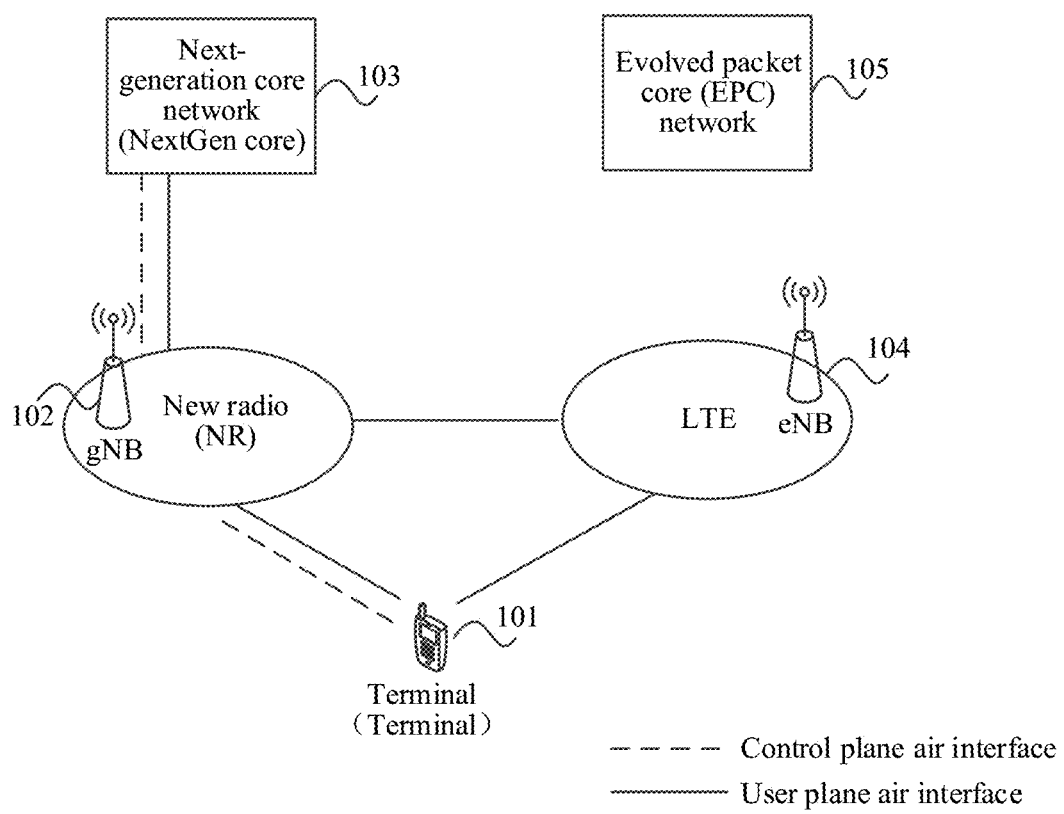
FIG. 3 is a schematic networking diagram of another wireless communications system related to this application.

It should be noted that, in addition to a networking mode applied to a single-connectivity scenario shown in FIG. 2, the wireless communications system 100 may be further a networking mode applied to a dual-connectivity (DC) scenario, for example, a non-standalone networking mode in future 5G, referring to FIG. 3.

As shown in FIG. 3, a wireless communications system 100 may be a 5G non-standalone networking mode, and may include a terminal 101, a network device 104 and a core network 105 in an LTE communications system, and a network device 102 and a core network 103 in a future new radio (NR) communications system. The terminal 101 is connected to both the network device 102 and the network device 104. The two network devices respectively serve as a master evolved NodeB (Master eNB, MeNB) and a secondary evolved NodeB (SeNB) of the terminal 101. The master evolved NodeB (MeNB) provides more control functions.

Figure 4:
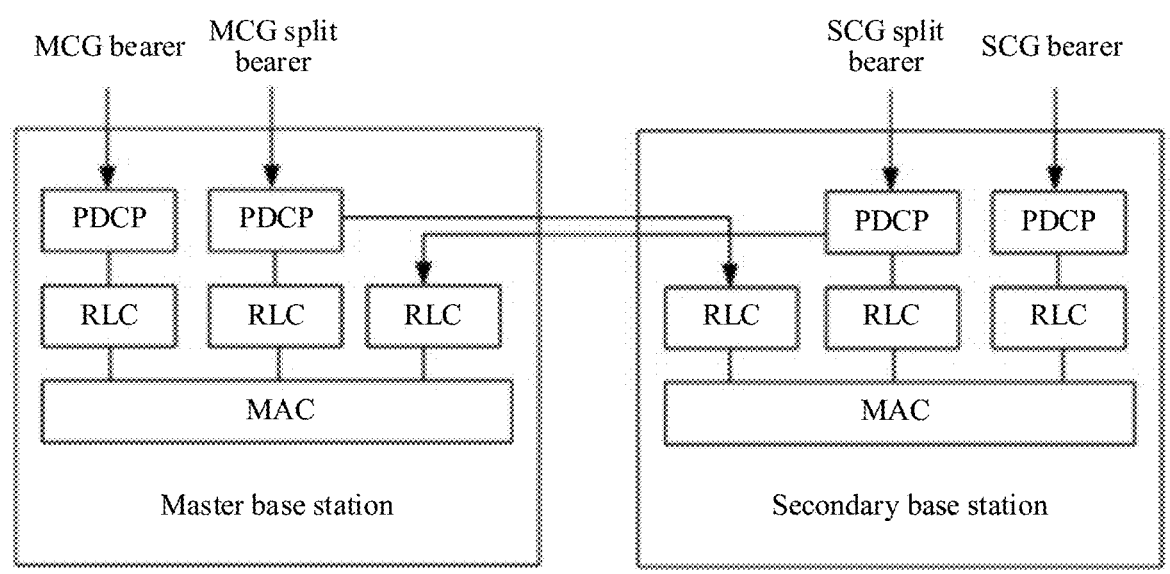
FIG. 4 is a schematic diagram of a bearer in a dual-connectivity scenario related to this application.

As shown in FIG. 4, because there are the master evolved NodeB and the secondary evolved NodeB, bearer types of the wireless communications system 100 shown in FIG. 3 may include:

1. A master cell group bearer (MCG bearer): data of the bearer can be transmitted through only a cell served by the master evolved NodeB and is ciphered and deciphered on the master evolved NodeB, and data is transmitted to the core network through the master evolved NodeB or data delivered by the core network is received through the master evolved NodeB.

2. A secondary cell group bearer (SCG bearer): data of the bearer can be transmitted through only a cell served by the secondary evolved NodeB and is ciphered and deciphered on the secondary evolved NodeB, and data is transmitted to the core network through the secondary evolved NodeB or data delivered by the core network is received through the secondary evolved NodeB.

3. A master cell group split bearer (MCG Split bearer): data of the bearer can be transmitted through a serving cell served by the master evolved NodeB and a serving cell served by the secondary evolved NodeB, but can be ciphered and deciphered on only the master evolved NodeB, and data is transmitted to the core network through the master evolved NodeB or data delivered by the core network is received through the master evolved NodeB.

4. A secondary cell group split bearer (SCG Split bearer): data of the bearer can be transmitted through a serving cell served by the master evolved NodeB and a serving cell served by the secondary evolved NodeB, but can be ciphered and deciphered on only the secondary evolved NodeB, and data is transmitted to the core network through the secondary evolved NodeB or data delivered by the core network is received through the secondary evolved NodeB.

It may be understood that, when a type of a bearer is changed, a PDCP layer entity corresponding to the bearer and responsible for ciphering is migrated to a new base station, data needs to be ciphered by using a key of the new base station. For example, as shown in FIG. 4, if the MCG bearer is replaced with the SCG bearer, a PDCP layer entity corresponding to the MCG bearer is migrated from an original MeNB to an original SeNB and a key to be used needs to be updated to a key of the original SeNB. Similarly, a PDCP layer entity corresponding to the SCG bearer is migrated from the original SeNB to the original MeNB, and a key to be used needs to be updated to a key of the original MeNB. The example is merely used to explain this application, and should not constitute a limitation.

It should be noted that, not limited to a non-standalone networking mode applied to a dual-connectivity scenario shown in FIG. 3, the wireless communications system 100 may be further a networking mode including a macro evolved NodeB (macro eNB) and a pico evolved NodeB (pico eNB) and applied to a dual-connectivity scenario in an LTE communications system. Not limited to the networking mode applied to the dual-connectivity scenario, the wireless communications system 100 may be further a networking mode applied to a multi-connectivity scenario. Networking modes of the wireless communications system are not limited in this application.

Figure 5:
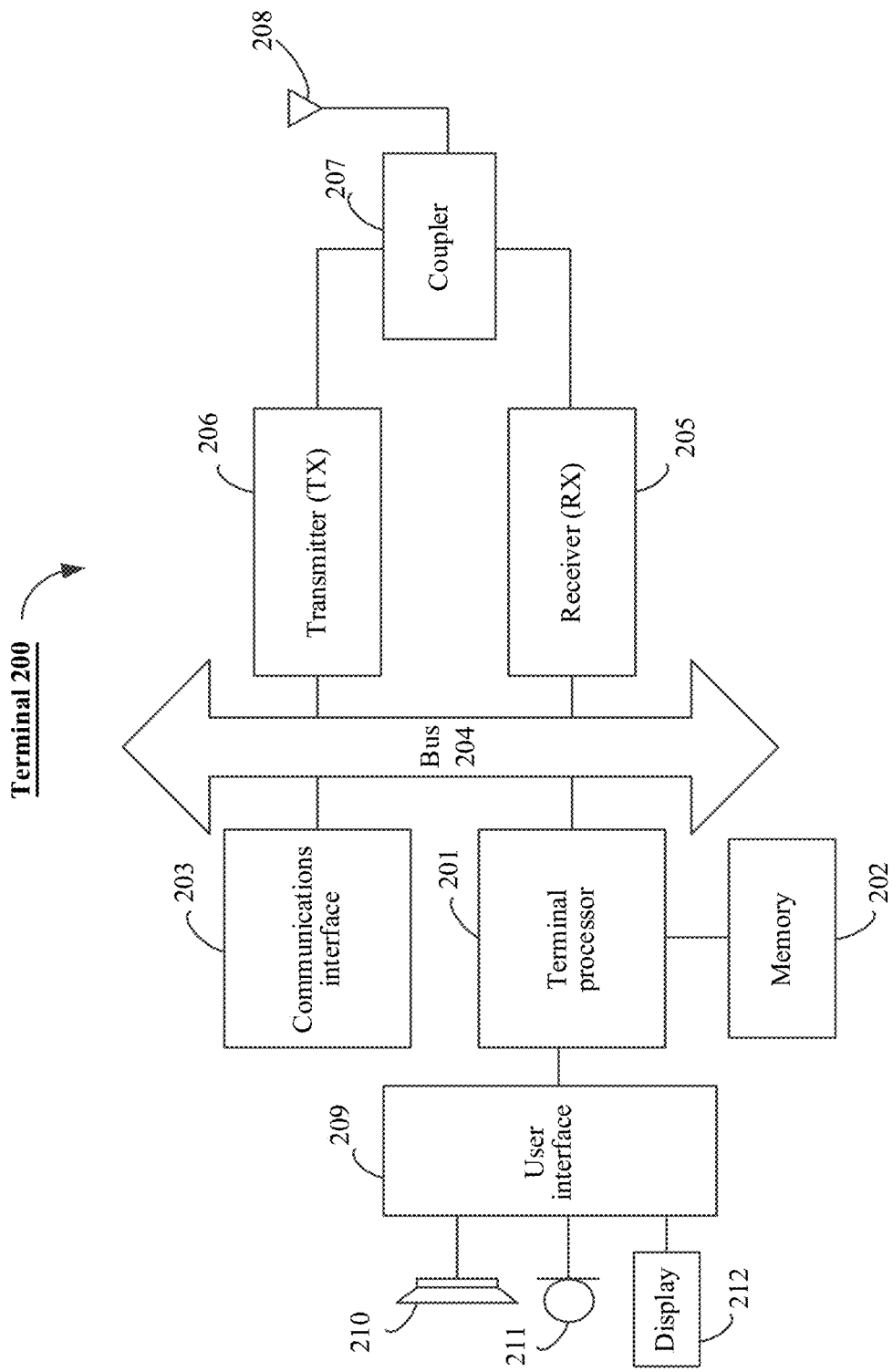
FIG. 5 is a schematic hardware architectural diagram of a terminal according to an embodiment of this application.

FIG. 5 shows a terminal 200 provided in some embodiments of this application. In this application, the terminal 200 may be a sending party (in uplink transmission) or a receiving party (in downlink transmission). As shown in FIG. 5, the terminal 200 may include: one or more terminal processors 201, a memory 202, a communications interface 203, a receiver 205, a transmitter 206, a coupler 207, an antenna 208, a user interface 209, and input/output modules (including an audio input/output module 210, a key input module 211, a display 212, and the like). The components may be connected through a bus 204 or in another manner, and in FIG. 5, an example is taken in which the components are connected through a bus.

The communications interface 203 may be used by the terminal 200 to communicate with another communications device, for example, a network device. Specifically, the network device may be a network device 300 shown in FIG. 6. Specifically, the communications interface 203 may be a communications interface in long term evolution (LTE) (4G), or a communications interface in 5G or future new radio. Not limited to being provided with a wireless communications interface, the terminal 200 may be further provided with a wired communications interface 203, for example, a local access network (LAN) interface.

The transmitter 206 may be configured to perform transmission processing such as signal modulation on a signal output by the terminal processor 201. The receiver 205 may be configured to perform receiving processing such as signal demodulation on a mobile communications signal received by the antenna 208. In some embodiments of this application, the transmitter 206 and the receiver 205 may be considered as a wireless modem. In the terminal 200, there may be one or more transmitters 206 and one or more receivers 205. The antenna 208 may be configured to convert electromagnetic energy in a transmission line into an electromagnetic wave in free space, or convert an electromagnetic wave in the free space into electromagnetic energy in the transmission line. The coupler 207 is configured to divide mobile communications signals received by the antenna 208 into a plurality of paths of mobile communications signals, and allocate the plurality of paths of mobile communications signals to a plurality of receivers 205.

In addition to the transmitter 206 and the receiver 205 shown in FIG. 5, the terminal 200 may further include other communications components, for example, a GPS module, a Bluetooth module, and a wireless fidelity (Wi-Fi) module. Not limited to supporting the foregoing expressed wireless communications signals, the terminal 200 may further support other wireless communications signals, for example, a satellite signal and a short-wave signal. Not limited to supporting wireless communications, the terminal 200 may further support wired communication by being provided with a wired network interface (for example, an LAN interface).

The input/output modules may be configured to implement interaction between the terminal 200 and a user/external environment, and may mainly include the audio input/output module 210, the key input module 211, the display 212, and the like. Specifically, the input/output modules may further include: a camera, a touchscreen, a sensor, and the like. The input/output modules all communicate with the terminal processor 201 through the user interface 209.

The memory 202 is coupled to the terminal processor 201, and is configured to store a variety of software programs and/or a plurality of sets of instructions. Specifically, the memory 202 may include a high-speed random access memory, or a non-volatile memory such as one or more disk storage devices, a flash memory device, or another non-volatile solid-state storage device. The memory 202 may store an operating system (briefly referred to as a system below), for example, an embedded operating system such as Android, iOS, Windows, or Linux. The memory 202 may further store a network communications program, and the network communications program may be configured to communicate with one or more adjuncts, one or more terminal devices, and one or more network devices. The memory 202 may further store a user interface program, and the user interface program may visually and vividly display content of an application program through a graphical operation interface, and receive a control operation of the user for the application program through input controls such as a menu, a dialog box, and a key.

In some embodiments of this application, the memory 202 may be configured to store an implementation program of a communications method provided in one or more embodiments of this application on the side of the terminal 200. For implementation of the communications method provided in one or more embodiments of this application, refer to subsequent embodiments.

The terminal processor 201 may be configured to read and execute a computer-readable instruction. Specifically, the terminal processor 201 may be configured to invoke a program stored in the memory 212, for example, an implementation program of the communications method provided in one or more embodiments of this application on the side of the terminal 200, and to execute an instruction included in the program.

It may be understood that the terminal 200 may be the terminal 101 in the wireless communications system 100 shown in FIG. 2 or FIG. 3, and may be implemented as a mobile device, a mobile station, a mobile unit, a wireless unit, a remote unit, a user agent, a mobile client, or the like.

It should be noted that, the terminal 200 shown in FIG. 5 is merely an implementation of the embodiments of this application, and in actual application, the terminal 200 may further include more or fewer components, and this is not limited herein.

Figure 6:
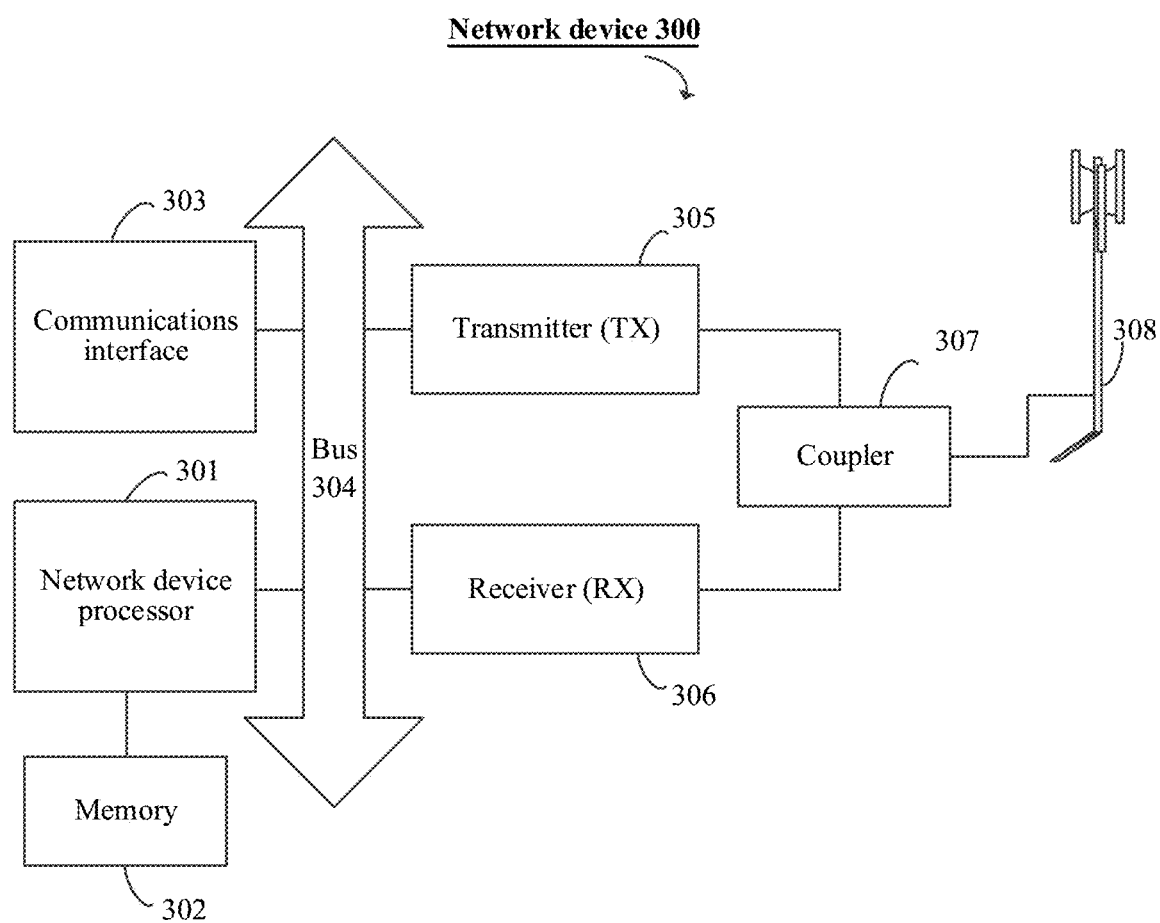
FIG. 6 is a schematic hardware architectural diagram of a base station according to an embodiment of this application.

FIG. 6 shows a network device 300 provided in some embodiments of this application. In this application, the network device 300 may be a sending party (in downlink transmission) or a receiving party (in uplink transmission). As shown in FIG. 6, the network device 300 may include: one or more network device processors 301, a memory 302, a communications interface 303, a transmitter 305, a receiver 306, a coupler 307, and an antenna 308. The components may be connected through a bus 304 or in another manner, and in FIG. 6, an example is taken in which the components are connected through a bus.

The communications interface 303 may be used by the network device 300 to communicate with another communications device, for example, a terminal device or another network device. Specifically, the terminal device may be a terminal 200 shown in FIG. 5. Specifically, the communications interface 303 may be a communications interface in long term evolution (LTE) (4G), or a communications interface in 5G or future new radio. Not limited to being provided with a wireless communications interface, the network device 300 may be further provided with a wired communications interface 303 to support wired communication, for example, a backhaul link between a network device 300 and another network device 300 may be a wired communication connection.

The transmitter 305 may be configured to perform transmission processing such as signal modulation on a signal output by the network device processor 301. The receiver 306 may be configured to perform receiving processing such as signal demodulation on a mobile communications signal received by the antenna 308. In some embodiments of this application, the transmitter 305 and the receiver 306 may be considered as a wireless modem. In the network device 300, there may be one or more transmitters 305 and one or more receivers 306. The antenna 308 may be configured to convert electromagnetic energy in a transmission line into an electromagnetic wave in a free space, or convert an electromagnetic wave in the free space into electromagnetic energy in the transmission line. The coupler 307 may be configured to divide mobile communications signals into a plurality of paths of mobile communications signals, and allocate the plurality of paths of mobile communications signals to a plurality of receivers 306.

The memory 302 is coupled to the network device processor 301, and is configured to store a variety of software programs and/or a plurality of sets of instructions. Specifically, the memory 302 may include a high-speed random access memory, or a non-volatile memory such as one or more disk storage devices, a flash memory device, or another non-volatile solid-state storage device. The memory 302 may store an operating system (briefly referred to as a system below), for example, an embedded operating system such as uCOS, VxWorks, or RTLinux. The memory 302 may further store a network communications program, and the network communications program may be configured to communicate with one or more adjuncts, one or more terminal devices, and one or more network devices.

The network device processor 301 may be configured to perform radio channel management, make a call, establish and remove a communications link, provide cell handover control for a user in a current control region, and the like. Specifically, the network device processor 301 may include: an administration module/communication module (AM/CM) (a center used for speech path exchange and information exchange), a basic module (BM) (configured to implement functions of call processing, signaling processing, radio resource management, radio link management, and circuit maintenance), a transcoder and submultiplexer (TCSM) (configured to implement functions of multiplexing, demultiplexing, and transcoding), and the like.

In this embodiment of this application, the network device processor 301 may be configured to read and execute a computer-readable instruction. Specifically, the network device processor 301 may be configured to invoke a program stored in the memory 302, for example, an implementation program of the communications method provided in one or more embodiments of this application on the side of the network device 300, and to execute an instruction included in the program.

It may be understood that, the network device 300 may be the network device 102 or the network device 104 in the wireless communications system 100 shown in FIG. 2 or FIG. 3, may be implemented as a base transceiver station, a radio transceiver, a basic service set (BSS), an extended service set (ESS), a NodeB, an eNodeB, an access point, a TRP, or the like.

It should be noted that, the network device 300 shown in FIG. 6 is merely an implementation of the embodiments of this application, and in actual application, the network device 300 may further include more or fewer components, and this is not limited herein.

An embodiment of this application provides a communications method. The communications method is applicable to respective corresponding embodiments based on the foregoing wireless communications system 1000, the foregoing terminal 200, and the foregoing network device 300.

In the communications method provided in this application, by using a feature of sequential submission at a PDCP layer and setting a "hole", a problem of key confusion in a period occurring when a key of a bearer is updated is resolved. Specifically, a sending party sets a sequence number of a first data packet located on the bearer and ciphered by using a new key and a sequence number of a last data packet located on the bearer and ciphered by using an old key, to be discontinuous, so as to deliberately make a sequence number interval (that is, a "hole"). In addition, the sending party sends indication information to a receiving party, to determine a sequence number corresponding to the "hole". Correspondingly, after the receiving party receives the indication information sent by the sending party, the receiving party may skip the "hole", decipher, by using a new key, a data packet following the "hole", and decipher, by using an old key, a data packet followed by the "hole". In this way, the data packet may be correctly deciphered, and it is ensured that data transmission is not interrupted.

In this application, when a key of a base station where a PDCP layer entity corresponding to a bearer is located is updated (corresponding a scenario 1 mentioned below), a key of the bearer needs be updated correspondingly. When the PDCP layer entity corresponding to the bearer is migrated to a new base station (corresponding a scenario 2 and a scenario 3 mentioned below), the key of the bearer needs to be also updated correspondingly. Herein, the scenarios may be referred to as trigger conditions on update of the key of the bearer. Not limited to the trigger conditions, there may be further another trigger condition capable of triggering update of the key of the bearer in actual application, and the technical solutions provided in this application are all applicable.

In this application, the bearer may be a data bearer DRB or a signaling bearer SRB.

In this application, the "hole" refers to at least one intermediate sequence number (one or more intermediate sequence numbers) between the sequence number of the first data packet ciphered by using the new key and the sequence number of the last data packet ciphered by using the old key.

In this application, the skipping a "hole" means that, on a premise that the receiving party receives the indication information, after the first data packet ciphered by using the new key is used as a next data packet of the last data packet ciphered by using the old key and the next data packet of the last data packet is deciphered, the next data packet of the last data packet is submitted to an upper layer, even though the sequence number of the first data packet ciphered by using the new key is not equal to the sequence number of the last data packet ciphered by using the old key plus 1. That is, in this application, it may be considered that the next data packet of the last data packet ciphered by using the old key is the first data packet ciphered by using the new key, even though there is a "hole" between the last data packet ciphered by using the old key and the first data packet ciphered by using the new key.

It may be understood that, because of the existence of a "hole", a data packet ciphered by using the new key is not submitted to an upper layer even through the data packet ciphered by using the new key reaches the receiving party before the indication information, thereby avoiding a data error.

Figure 7A:
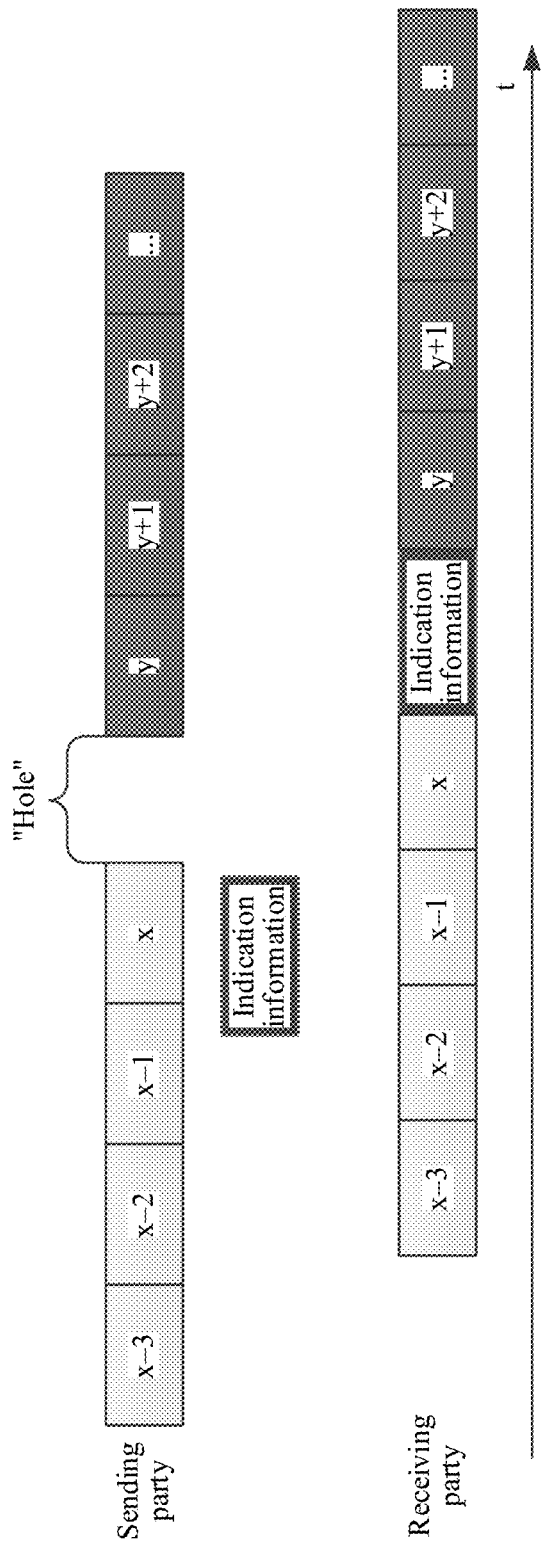
FIG. 7A and FIG. 7B are schematic diagrams of two receiving time sequences about a "hole" in this application.
Figure 7B:
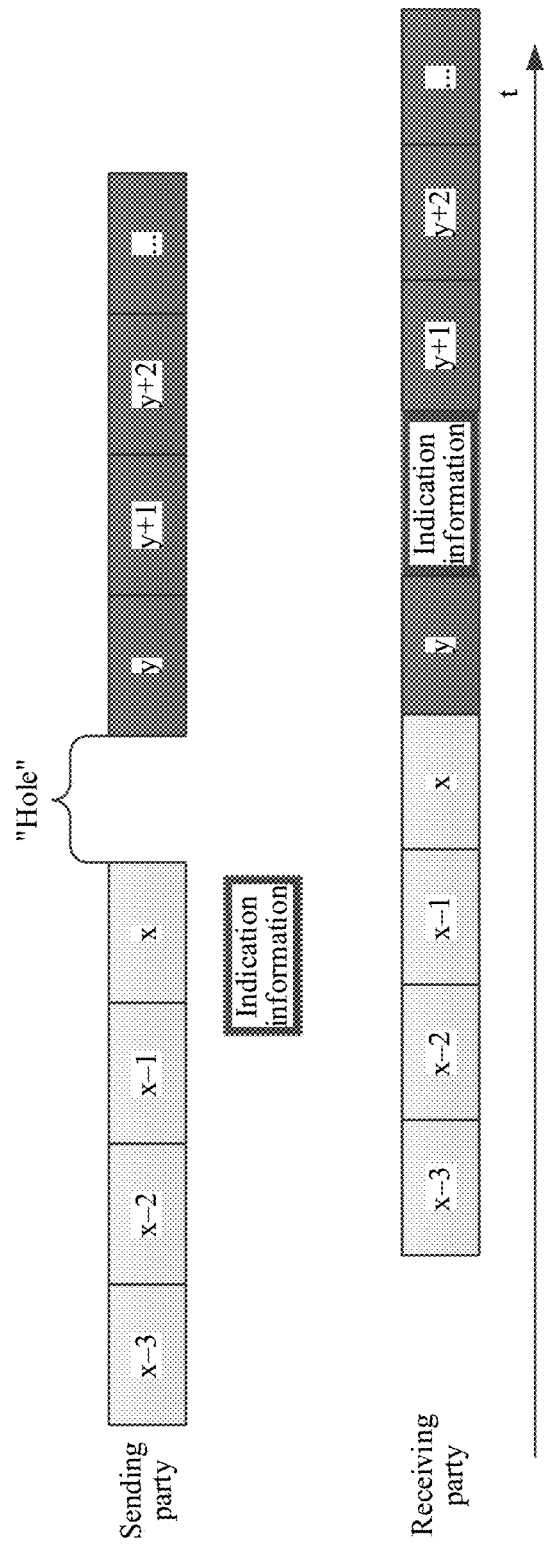

For example, as shown in FIG. 7A and FIG. 7B, on the sending party, a sequence number x of the last data packet ciphered by using the old key and a sequence number y of the first data packet ciphered by using the new key are discontinuous, that is, y is greater than x+1. That is, there is a "hole" between x and y. Herein, x and y are both positive integers.

In a possible situation, as shown in FIG. 7A, the indication information reaches the receiving party before the data packet y. For this situation, the receiving party may skip the "hole" between x and y based on the indication information, decipher the data packet y by using the new key, then submit the deciphered data packet x to the upper layer, and then submit the deciphered data packet y to the upper layer.

In another possible situation, as shown in FIG. 7B, the indication information reaches the receiving party after the data packet y. For this situation, because of the existence of the "hole", the data packet y is not submitted to the upper layer. Only after the receiving party receives the indication information, the receiving party skips the "hole", deciphers the data packet y by using the new key, submits the deciphered data packet x to the upper layer, and then immediately submits the deciphered data packet y to the upper layer.

It should be noted that, the example shown in FIG. 7 is merely used to explain this application, and should not constitute a limitation.

It should be noted that a sequence number in this application may be a PDCP sequence number in a PDCP PDU, or a PDCP COUNT value.

It should be noted that, integrity protection is performed on data of a signaling bearer; in a system such as a future 5G system or a new radio (NR) system, integrity protection may need to be also performed on data of a data bearer, and this is also related to the problem of key update. The communications method provided in this application may be also applicable to a scenario of integrity protection.

Similarly, when the communications method provided in this application is applied to the scenario of integrity protection, the key of the bearer may be updated by using the feature of sequential submission at the PDCP layer and setting a "hole". Specifically, the sending party may set the sequence number of the first data packet that is located on the bearer and on which integrity protection is performed by using the new key and the sequence number of the last data packet that is located on the bearer and on which integrity protection is performed by using the old key, to be discontinuous, so as to deliberately make a sequence number interval (that is, a "hole"). In addition, the sending party sends the indication information to the receiving party, to determine a sequence number corresponding to the "hole". Correspondingly, after the receiving party receives the indication information sent by the sending party, the receiving party may skip the "hole", perform, by using the new key, integrity check on the data packet following the "hole", and perform, by using the old key, integrity check on the data packet followed by the "hole". The following overall solution in an embodiment in FIG. 8 and specific embodiments in three major scenarios in embodiments shown in FIG. 9 to FIG. 11A and FIG. 11B may also be similarly applicable to integrity protection of a data packet. "Ciphering" in each embodiment may be simply replaced with "integrity protection (or production of an integrity message authorization code)", and "deciphering" may be replaced with "integrity check". For simplicity of the specification, details are not described repeatedly. In this way, correct integrity check may be performed on a data packet, and it is ensured that data transmission is not interrupted.

Content implementation of the indication information and a transmission manner of the indication information in this application are described below.

(1) Content Implementation of the Indication Information and Specific Implementation of Skipping a "Hole"

In a first implementation, the indication information may include the sequence number of the first data packet ciphered by using the new key. For ease of description, a sequence number y may be used to indicate the sequence number of the first data packet ciphered by using the new key.

Specifically, in the first implementation, the "hole" skipped by the receiving party corresponds to a sequence number y−1 to a sequence number y−n. The receiving party may decipher a data packet whose sequence number is greater than or equal to y by using the new key, and decipher a data packet whose sequence number is less than or equal to y−n−1 by using the old key, where y and n are positive integers. Typically, n may be 1.

In a second implementation, the indication information may include the sequence number of the last data packet ciphered by using the old key. For ease of description, a sequence number x may be used to indicate the sequence number of the last data packet ciphered by using the old key.

Specifically, in the second implementation, the "hole" skipped by the receiving party corresponding to a sequence number x+1 to a sequence number x+n. The receiving party may decipher a data packet whose sequence number is greater than or equal to x+n+1 by using the new key, and decipher a data packet whose sequence number is less than or equal to x by using the old key, where x and n are positive integers. Typically, n may be 1.

In a third implementation, the indication information may include information about a sequence number corresponding to the "hole", that is, information about the at least one intermediate sequence number between the sequence number of the first data packet ciphered by using the new key and the sequence number of the last data packet ciphered by using the old key.

In the third implementation, the information about the sequence number corresponding to the "hole" may be a range [a, b] of the at least one intermediate sequence number. In this way, the "hole" skipped by the receiving party corresponds to a sequence number a to a sequence number b. The receiving party may decipher a data packet whose sequence number is greater than b by using the new key, and decipher a data packet whose sequence number is less than a by using the old key. Optionally, the information about the sequence number corresponding to the "hole" may be further the at least one intermediate sequence number, where a and b are positive integers.

In some optional embodiments, the indication information may further include: a quantity of sequence numbers included in the at least one intermediate sequence number. Optionally, the quantity of sequence numbers included in the at least one intermediate sequence number may be further a predefined value.

For example, it is assumed that the at least one intermediate sequence number includes one sequence number (predefined by using a protocol or indicated by using the indication information). That is, the sequence number y of the first data packet ciphered by using the new key is equal to the sequence number x of the last data packet ciphered by using the old key plus 2, and a sequence number (x+1) is the intermediate sequence number. When the indication information includes the sequence number x of the last data packet ciphered by using the old key, the indication information is used to indicate that the receiving party skips a next sequence number of x, that is, x+1. When the indication information includes the sequence number y of the first data packet ciphered by using the new key, the indication information is used to indicate that the receiving party skips a previous sequence number of y, that is, y−1.

(2) Transmission Manner of the Indication Information

In some optional embodiments, the indication information may be carried in RRC layer signaling or a PDCP control PDU. For example, in a cell handover scenario, a base station may add the indication information to an RRC message sent to a terminal and used to trigger cell handover. The example is merely an implementation of this application, and should not constitute a limitation.

In a possible scenario, there are a plurality of bearers whose keys need to be updated. Specifically, the indication information for the plurality of bearers may be at a bearer level.

In an implementation, for the plurality of bearers, the indication information and bearer identifiers respectively corresponding to the plurality of bearers may be carried in a piece of signaling (which may be RRC layer signaling or a PDCP control PDU).

In another implementation, for the plurality of bearers, a piece of signaling may be separately sent for each bearer, that is, a plurality of pieces of signaling are sent, and the plurality of pieces of signaling may respectively carry the indication information respectively corresponding to the plurality of bearers. For example, the sending party respectively sends a PDCP control PDU through each bearer. A PDCP control PDU sent on a bearer may carry the indication information corresponding to the bearer. In addition, a PDCP control PDU sent on a bearer carries identification information of the bearer. In this way, after the receiving party receives a PDCP control PDU, the receiving party may directly know a bearer corresponding to the indication information carried in the PDCP control PDU, and the bearer corresponding to the indication information does not need to be additionally indicated, so that signaling overheads may be decreased.

In the cell handover scenario, the indication information may be sent to the terminal through a source base station, sent to the terminal through a target base station, or sent to the terminal through the source base station and the target base station.

In a dual-connectivity or multi-connectivity scenario, the indication information may be sent to the terminal through a plurality of serving base stations (for example, an MeNB and an SeNB), so that it may be ensured that the terminal receives the indication information as early as possible.

Figure 8:
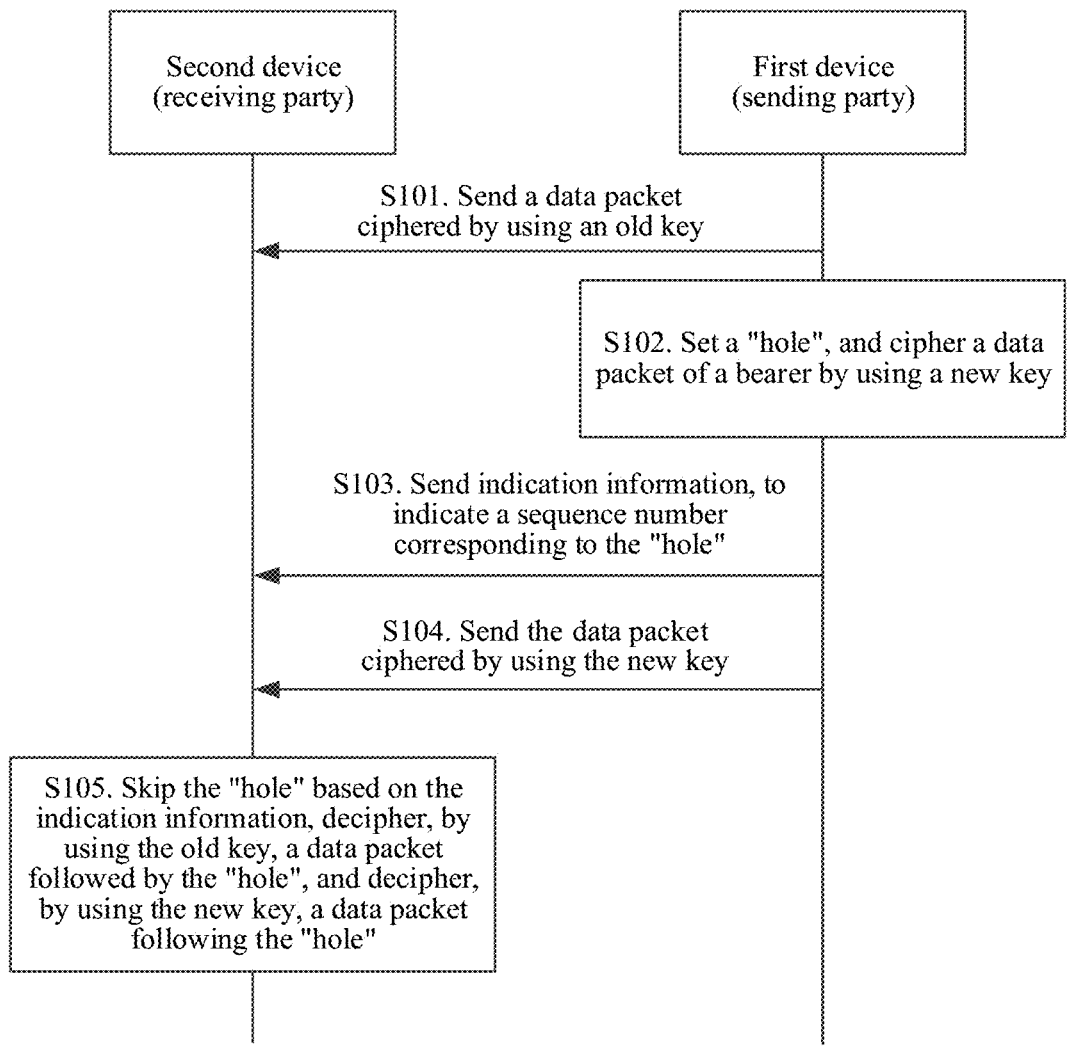
FIG. 8 is a whole schematic flowchart of a communications method according to this application.

FIG. 8 shows a whole process of a communications method provided in this application. In the communications method shown in FIG. 8, a first device is a sending party, and a second device is a receiving party. In an uplink transmission process, the first device may be a terminal, and the second device may be a network device. In a downlink transmission process, the first device may be a network device, and the second device may be a terminal. As shown in FIG. 8, the communications method may be unfolded as follows.

S102: For a bearer whose key needs to be updated, the first device may set a "hole", and cipher a data packet of the bearer by using a new key. Herein, the "hole" refers to at least one intermediate sequence number between a sequence number of a first data packet ciphered by using the new key and a sequence number of a last data packet ciphered by using an old key. For the definition and descriptions of the "hole" in this application, refer to the foregoing content, and details are not described herein. For trigger conditions on which a key of the bearer needs to be updated, refer to the foregoing content, and details are not described herein.

S103: The first device sends indication information to the second device, to indicate a sequence number corresponding to the "hole".

S104: The first device sends the data packet ciphered by using the new key, to the second device. It should be understood that, before the key used by the bearer is updated, the first device may cipher the data packet of the bearer by using the old key and send the data packet ciphered by using the old key, to the second device. Refer to Slot.

Specifically, for the content implementation and the transmission manner of the indication information, refer to the foregoing content and details are not described herein.

S105: Correspondingly, the second device receives the indication information and the data packet sent by the first device. In addition, the second device may skip the "hole" based on the indication information, decipher, by using the old key, the data packet followed by the "hole", and decipher, by using the new key, the data packet following the "hole". For how to skip the "hole" based on the indication information, refer to the foregoing content and details are not described herein.

It may be understood that, because of a transmission feature of an air interface of mobile communications, the data packet ciphered by using the old key, the indication information, and the data packet ciphered by using the new key may reach the second device disorderly. Because the existence of the "hole" and the feature of sequential submission at the PDCP layer, regardless of whether the indication information arrives before or after the first data packet ciphered by using the new key, the second device can correctly decipher the data packet based on the indication information. For details, refer to related descriptions in FIG. 7A and FIG. 7B, and details are not described herein.

It may be understood that, as shown in FIG. 8, in the communications method provided in this application, when the key used by the bearer is updated, the data packet ciphered by using the new key and the data packet ciphered by using the old key are correctly deciphered on a premise of ensuring that data transmission is not interrupted, thereby completely resolving the problem of key confusion in a period.

It should be noted that, the first device is not limited by a time sequence shown in FIG. 8. Herein, the first device is not limited to setting a "hole" first and then ciphering the data packet by using the new key, and the first device may alternatively cipher the data packet of the bearer first by using the new key and then send the data packet ciphered by using the new key, to the second device. That is, S104 in the figure may alternatively occur before S103.

In some optional embodiments of this application, for the received data packet, the second device may decipher the received data packet first. After receiving the indication information, the second device determines whether the key previously used to decipher the data packet is correct. If the key is incorrect, the second device deciphers the received data packet again by using a correct key. In this way, a case in which a large quantity of data packets that need to be deciphered at the same time may be avoided. This embodiment is applicable to the scenario shown in FIG. 7B, that is, a scenario in which the indication information arrives after the first data packet ciphered by using the new key. Some possible implementations may include:

A first implementation: a data packet of the bearer from the second device is deciphered by using an old key. The implementation is more applicable to a situation in which the second device has not obtained a new key. For example, it is assumed that the second device is a terminal, and the first device is a base station. When the terminal has not received an RRC message sent by the base station and used to trigger key change, the terminal may decipher the received data packet by using the old key.

In the first implementation, after receiving the indication information, the second device may determine, based on the indication information, whether the data packet deciphered by using the old key has been correctly deciphered; and if the data packet is incorrectly deciphered, decipher the incorrectly deciphered data packet again by using the new key.

A second implementation: a data packet of the bearer from the second device is deciphered by using a new key. The implementation is more applicable to a situation in which the second device has obtained the new key. For example, it is assumed that the second device is a terminal, and the first device is a base station. After the terminal receives an RRC message sent by the base station and used to trigger key change, the terminal may decipher the received data packet by using the new key. The example is merely used to explain this application, and should not constitute a limitation.

In the second implementation, after receiving the indication information, the second device may determine, based on the indication information, whether the data packet deciphered by using the new key has been correctly deciphered; and if the data packet is incorrectly deciphered, decipher the incorrectly deciphered data packet again by using the old key.

It should be noted that, in the foregoing two implementations, whether the second device deciphers a data packet first by using the new key or the old key is not limited to policies mentioned in the foregoing two implementations, the policies may be different in actual application, and this should not constitute a limitation.

In some optional embodiments of this application, after receiving data packets, the second device may first determine whether the data packets are sequential; and only if the data packets are sequential, the second device deciphers the data packets, other than deciphers the data packets first. In this way, unnecessary deciphering may be decreased. It should be noted that, in this application, after receiving the indication information, the second device may skip the "hole", and consider that the first data packet ciphered by using the new key and the last data packet ciphered by using the old key are sequential.

The technical solutions provided in this application are applicable to at least the following scenarios (update of the key of the bearer) (not limited to the scenarios):

Scenario 1: A key of a serving base station is updated, and a key used by each bearer is updated accordingly. For example, a PDCP COUNT value is wrapped around, bearer IDs are used up, or the like.

Scenario 2: It is a dual-connectivity or multi-connectivity scenario, and a bearer type is reconfigured. For example, the bearer is changed from an MCG split bearer to an SCG split bearer.

Scenario 3: It is a cell handover scenario (the key of the bearer is changed from a key of a source base station to a key of a target base station).

The technical solutions provided in this application are separately described below in detail in the foregoing three major scenarios.

Figure 9:
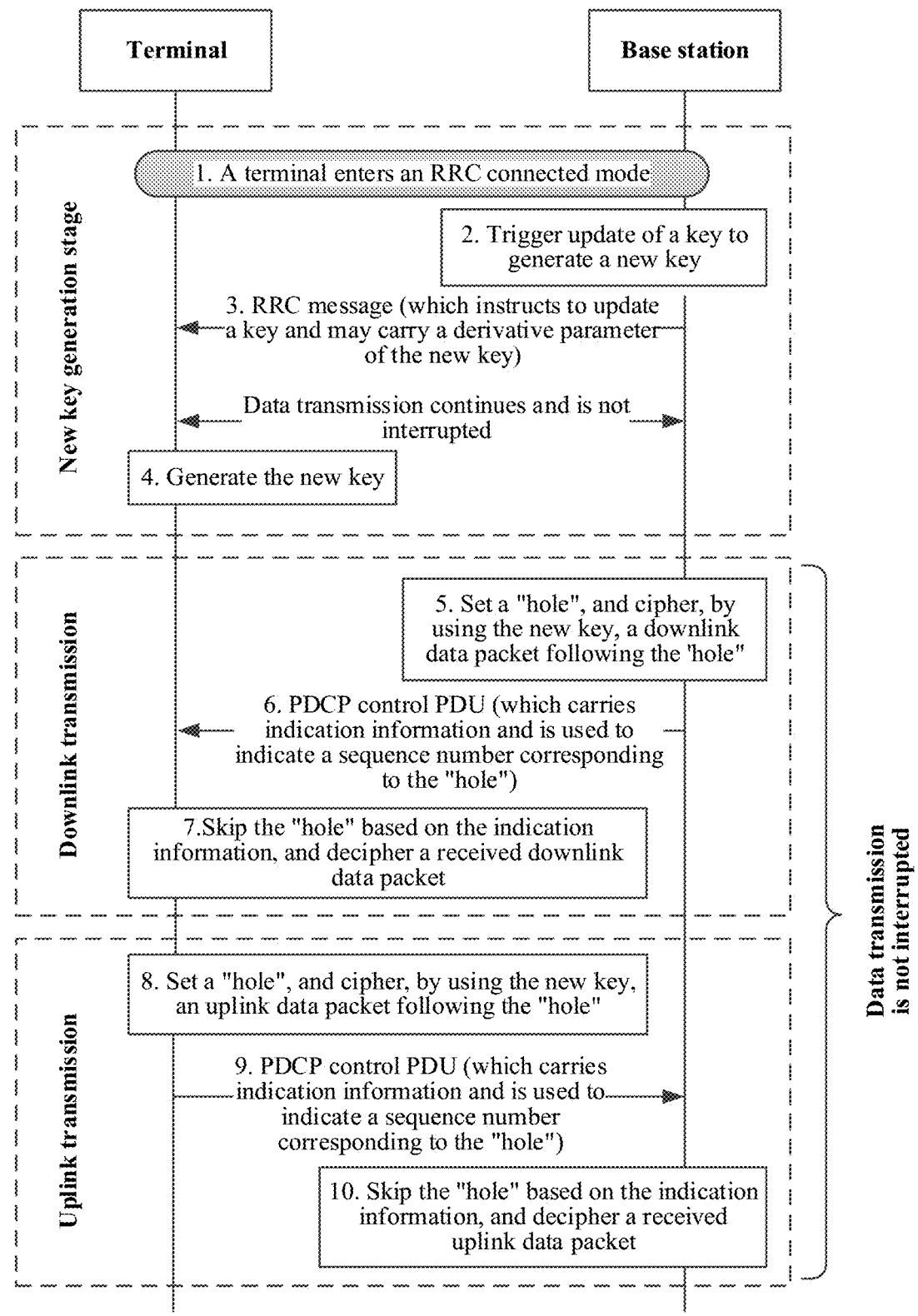
FIG. 9 is a schematic flowchart of a communications method according to this application, which is implemented in a scenario of update of a key of a base station.

FIG. 9 shows specific implementation of a communications method provided in this application in the scenario 1. It may be understood that, in a downlink transmission process, a base station is the foregoing first device, and a terminal is the foregoing second device. In an uplink transmission process, the terminal is the foregoing first device, and the base station is the foregoing second device. Specific implementation of the communications method provided in this application in the scenario 1 is described below from three stages.

(1) A new key generation stage: refer to step 2 to step 4.

Step 1: The terminal enters an RRC connected mode, and establishes a bearer with the base station to transmit data.

Step 2: The base station triggers update of a key to generate a new key. Specifically, a trigger condition of update of the key of the base station may be that a PDCP COUNT value is wrapped around, bearer IDs are used up, or the like.

Step 3: After the base station generates the new key, the base station may send an RRC message to the terminal to trigger the terminal to update a key. Herein, the RRC message may be an RRC reconfiguration message.

Step 4: After receiving the RRC message, the terminal generates a new key. Optionally, the RRC message may carry a derivative parameter used to generate the new key. Optionally, the derivative parameter used to generate the new key may be sent to the terminal through a PDCP control PDU.

Optionally, on a base station side and on a terminal side, the new key does not immediately replace the old key, and instead, the new key and the old key are used at the same time for a period of time, so that failure of deciphering of a data packet that is deciphered by using the old key and that is delayed to arrive can be avoided.

(2) In a downlink transmission process, the key of the bearer is updated. Refer to step 5 to step 7.

Step 5: For a bearer whose key needs to be updated, the base station may set a "hole", and cipher, by using the new key, a downlink data packet following the "hole". It should be understood that, in the scenario 1, the key of the base station is updated, and keys of all bearers between the base station and the terminal need to be updated. Herein, the "hole" refers to at least one intermediate sequence number between a sequence number of a first data packet ciphered by using the new key and a sequence number of a last data packet ciphered by using the old key. For the definition and descriptions of the "hole" in this application, refer to the foregoing content, and details are not described herein.

Step 6: The base station sends the PDCP control PDU carrying the indication information, to the terminal. The indication information is used to indicate a sequence number corresponding to the "hole".

Optionally, the indication information may be further carried in the RRC message in step 3. That is, the base station may set a "hole" before step 3, and then deliver the indication information through the RRC message. The base station may not perform step 6.

For the content implementation and the transmission manner of the indication information, refer to the foregoing content and details are not described herein.

In specific implementation, the base station may send, to the terminal, the PDCP control PDU carrying the indication information after sending the RRC message in step 3, or send the PDCP control PDU in a period of time after sending the RRC message, and this is not limited in this application.

Step 7: After receiving the indication information, the terminal may skip the "hole" based on the indication information, decipher, by using the old key, a downlink data packet followed by the "hole", and decipher, by using the new key, the downlink data packet following the "hole". For how to skip the "hole" based on the indication information, refer to the foregoing content and details are not described herein.

(3) In an uplink transmission process, the key used by the bearer is updated. Refer to step 8 to step 10.

Step 8: For a bearer whose key is updated, the terminal may set a "hole", and cipher, by using the new key, an uplink data packet following the "hole". For the definition and descriptions of the "hole" in this application, refer to the foregoing content, and details are not described herein.

Step 9: The terminal sends a PDCP control PDU carrying indication information, to the base station. The indication information is used to indicate a sequence number corresponding to the "hole". Optionally, the indication information may be carried in an RRC response message sent by the terminal to the base station. For the content implementation and the transmission manner of the indication information, refer to the foregoing content and details are not described herein.

Step 10: After receiving the indication information, the base station may skip the "hole" based on the indication information, decipher, by using the old key, an uplink data packet followed by the "hole", and decipher, by using the new key, the uplink data packet following the "hole". For how to skip the "hole" based on the indication information, refer to the foregoing content and details are not described herein.

It should be noted that, in the whole process in which the key of the bearer is updated, data transmission between the base station and the terminal is not interrupted. That is, in the process in which the new key and the old key of the bearer are exchanged, the data packet followed by the "hole" is ciphered by using the old key, and the ciphered data packet is sent; and the data packet following the "hole" is ciphered by using the new key, and the ciphered data packet is sent. That is, the data transmission may completely be free of impact of the update of the key of the bearer.

It should be noted that, not limited to a time sequence shown in FIG. 9, when the indication information reaches the terminal, the terminal may have not generated the new key. That is, step 4 may occur after step 6. Even, when the indication information reaches the terminal, the RRC message used to trigger generation of the new key may have not reached the terminal. That is, step 3 and step 4 may both occur after step 6. For the two situations, the terminal may decipher the data packet following the "hole" based on the indication information after the new key is generated.

Optionally, when the indication information reaches the terminal before the RRC message used to trigger generation of the new key, a timer may be set, and the received data packet that needs to be ciphered by using the new key is buffered first. If the terminal receives the RRC message before the timer times out, the terminal generates a new key to decipher the data packet; otherwise, the terminal performs processing based on a failure, and returns a failure result to the base station.

It should be noted that, not limited to the time sequence shown in FIG. 9, the uplink transmission process may occur before the downlink transmission process, or the uplink transmission process and the downlink transmission process may occur at the same time.

It may be understood that, in the scenario 1, when a key of the base station is updated, the sending party sets a "hole" and indicates a sequence number corresponding to the "hole", so that a data packet reaching the receiving party can be correctly deciphered by the receiving party, and it can be ensured that data transmission is continuous and not interrupted.

It may be understood that, by using the method in this embodiment, when the key of the base station is updated, the key may be not updated through cell handover; and instead, the key is updated by using an RRC connection reconfiguration process, and a PDCP entity is not reestablished, thereby causing no interruption of data transmission.

Figure 10A:
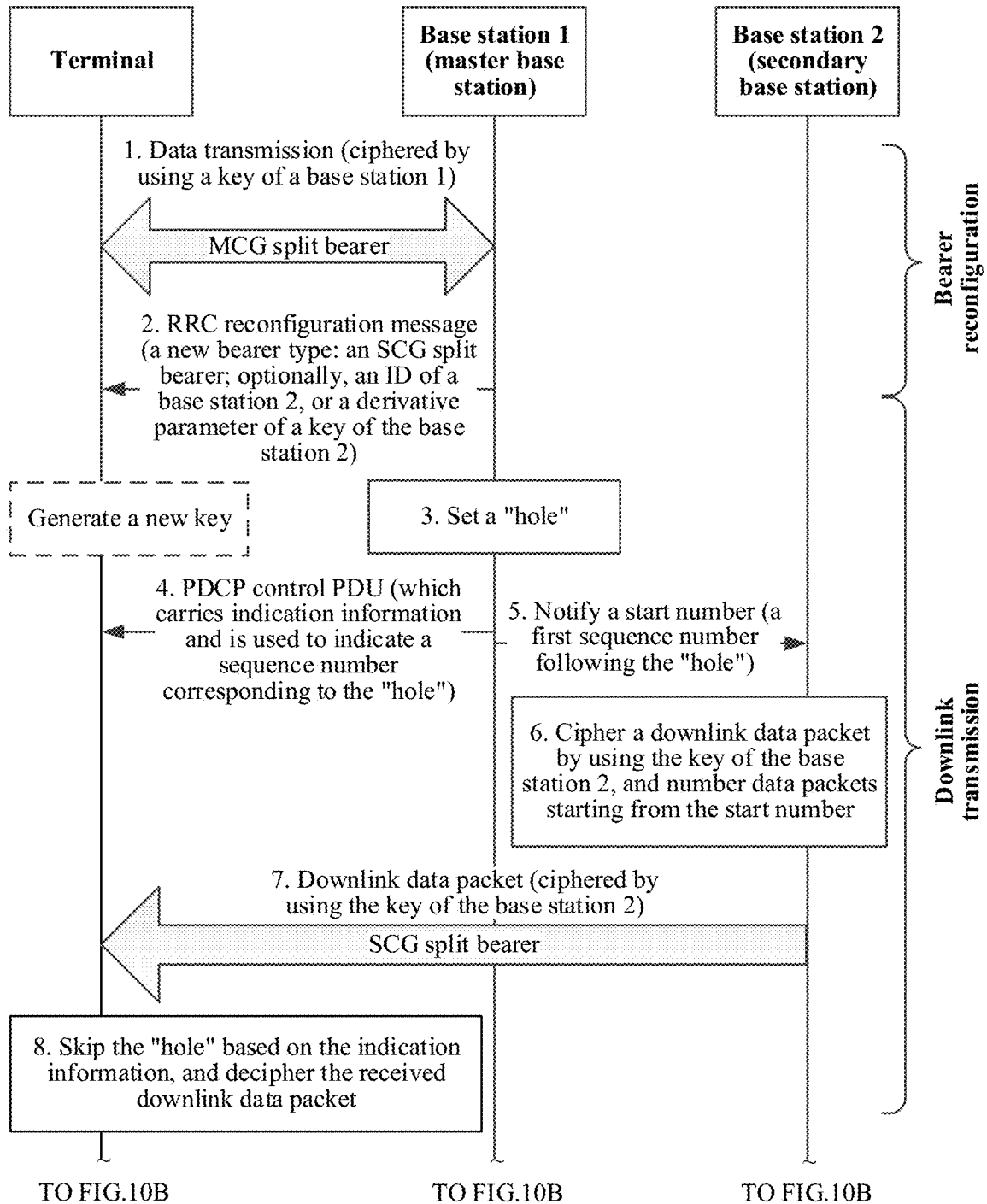
FIG. 10A and FIG. 10B are a schematic flowchart of a communications method according to this application, which is implemented in a bearer reconfiguration scenario.
Figure 10B:
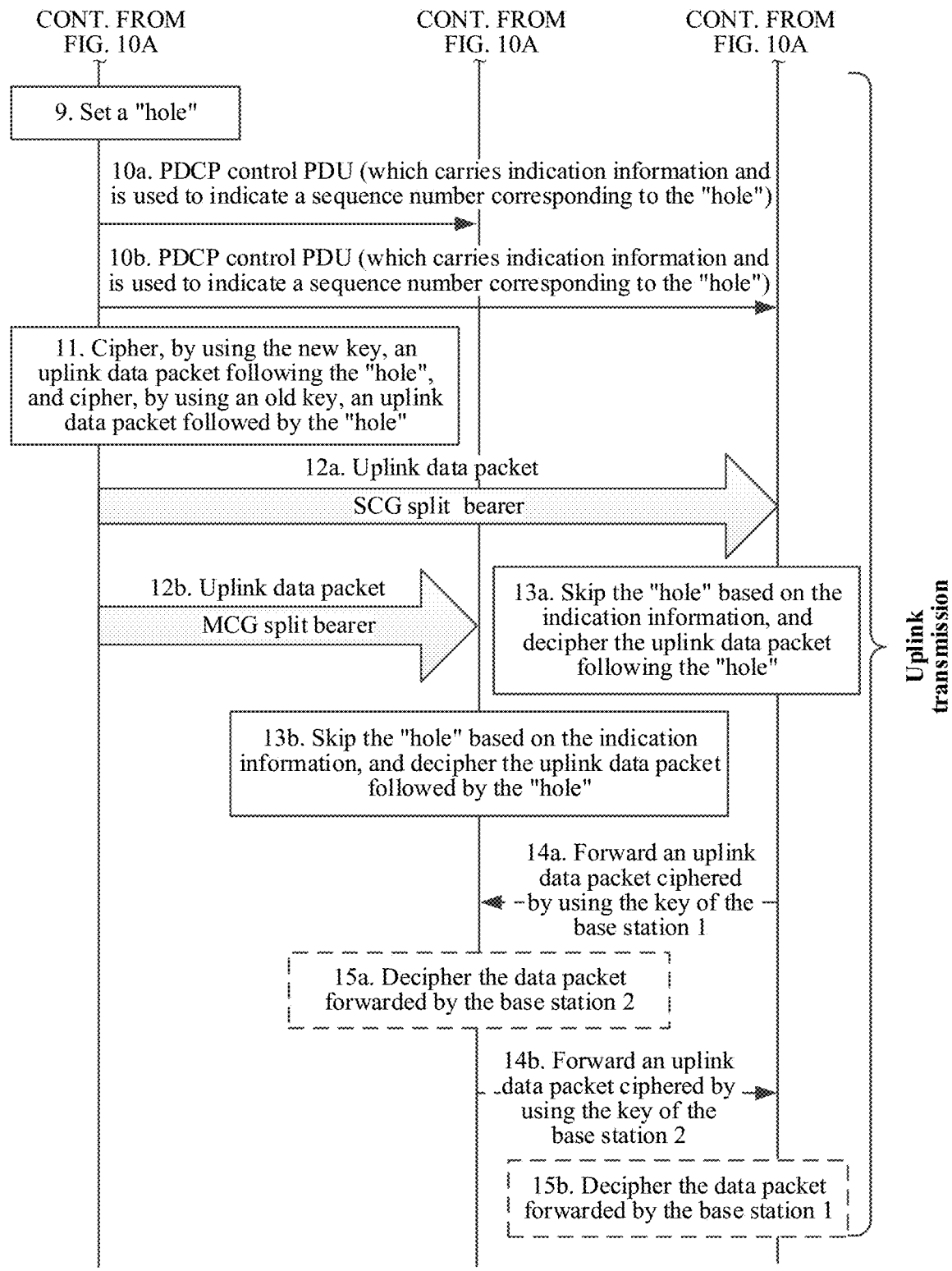

FIG. 10A and FIG. 10B show specific implementation of a communications method provided in this application in the scenario 2. In an embodiment in FIG. 10A and FIG. 10B, description is made by using an example in which a terminal is connected to two serving base stations, where a base station 1 is a master base station (for example, an MeNB in LTE), and a base station 2 is a secondary base station (for example, an SeNB in LTE). It may be understood that, in a downlink transmission process, one or more serving base stations are the foregoing first devices, and the terminal is the foregoing second device. In an uplink transmission process, the terminal is the foregoing first device, and the one or more serving base stations are the foregoing second devices. The communications method provided in this application is described in the embodiment in FIG. 10A and FIG. 10B by using bearer reconfiguration in a dual-connectivity scenario as an example. It is assumed that a type of a bearer before reconfiguration is an MCG split bearer, and the type of the bearer after reconfiguration is an SCG split bearer. Further description is made below.

(1) Bearer reconfiguration. Refer to step 1 and step 2.

Step 1: The terminal performs data transmission with the base station 1 based on a bearer (for example, an MCG split bearer). Herein, a data packet of the bearer is ciphered by using a key of the base station 1.

Step 2: The base station 1 sends an RRC reconfiguration message to the terminal, to trigger reconfiguration of the bearer and update the type of the bearer. Specifically, the RRC reconfiguration message may carry information about a new bearer type (for example, an SCG split bearer). In a multi-connectivity scenario, the RRC reconfiguration message may further carry an identifier of the base station 2, to instruct a PDCP entity of the bearer to be migrated to the base station 2, and the terminal may transmit data through a serving cell served by the base station 2.

Optionally, the RRC reconfiguration message may further carry a derivative parameter of a key of the base station 2. Optionally, after receiving the RRC reconfiguration message, the terminal may generate a new key (that is, the key of the base station 2). It should be understood that, when the base station 1 adds the base station 2 as the secondary base station, the base station 1 may further deliver the derivative parameter of the key of the base station 2 to the terminal. In this way, when the PDCP entity of the bearer is migrated to the base station 2, the base station 1 does not need to send the derivative parameter to the terminal again.

(2) In a downlink transmission process, the key of the bearer is updated. Refer to step 3 to step 8.

Step 3: The base station 1 (the master base station) sets a "hole". For the "hole", refer to the foregoing content, and details are not described herein.

Step 4: The base station 1 sends a PDCP control PDU carrying indication information, to the terminal, to indicate a sequencer number corresponding to the "hole". For implementation of the indication information, refer to the foregoing content, and details are not described herein.

Step 5: The base station 1 sends a start number to the base station 2, to instruct the base station 2 to number data packets starting from the start number.

Herein, the start number is a first sequence number following the "hole". For example, assuming that a sequence number of a last data packet ciphered by using a key of the base station 1 is 100 and a sequence number corresponding to the "hole" is 101, the start number is 102. The example is merely used to explain this application, and should not constitute a limitation.

Step 6 and step 7: The base station 2 ciphers a downlink data packet by using the key of the base station 2, and numbers downlink data packets starting from the start number. The base station 2 sends the downlink data packet ciphered by using the key of the base station 2, to the terminal.

Step 8: The terminal may skip the "hole" based on the indication information, and decipher the received downlink data packet.

Herein, downlink data packets received by the terminal may include a downlink data packet ciphered by using the key of the base station 2, and may further include a downlink data packet ciphered by using the key of the base station 1.

Specifically, the terminal may decipher a data packet followed by the "hole" by using the key of the base station 1, and decipher a data packet following the "hole" by using the key of the base station 2, so that downlink data packets may be correctly deciphered.

(3) In an uplink transmission process, the key of the bearer is updated. Refer to step 9 to step 18.

Step 9: The terminal may set a "hole".

Step 10a and step 10b: The terminal may send a PDCP control PDU carrying indication information, to each of the base station 1 and the base station 2, to indicate a sequencer number corresponding to the "hole". The base station 1 and the base station 2 respectively determine, based on the indication information received by the base station 1 and the base station 2, whether a received uplink data packet is ciphered by using the key of the base station 1 or is ciphered by using the key of the base station 2.

It should be understood that, based on respective functions of the MCG split bearer and the SCG split bearer, it may be learned that data of the MCG split bearer or data of the SCG split bearer may be transmitted through a serving cell served by the master base station (that is, the base station 1) and a serving cell served by the secondary base station (that is, the base station 2).

Step 11: The terminal may cipher, by using a new key (that is, a key of the base station 2), an uplink data packet following the "hole", or cipher, by using an old key (that is, a key of the base station 1), an uplink data packet followed by the "hole".

Step 12a and step 12b: The terminal may send an uplink data packet to the base station 2, or send an uplink data packet to the base station 1.

It should be understood that, data of the MCG split bearer or data of the SCG split bearer may be transmitted through the serving cell served by the master base station (that is, the base station 1) and the serving cell served by the secondary base station (that is, the base station 2). Therefore, uplink data packets sent by the terminal to the base station 2 may include a data packet ciphered by using the key of the base station 1. Similarly, uplink data packets sent by the terminal to the base station 1 may include a data packet ciphered by using the key of the base station 2.

Step 13a and step 13b: The base station 2 may skip the "hole" based on the indication information, and decipher the data packet following the "hole" by using the key of the base station 2, referring to step 13a. The base station 1 may skip the "hole" based on the indication information, and decipher the data packet followed by the "hole" by using the key of the base station 1, referring to step 13b.

Step 14a and step 14b: Optionally, if uplink data packets received by the base station 2 include an uplink data packet ciphered by using the key of the base station 1, the base station 2 forwards the uplink data packet ciphered by using the key of the base station 1, to the base station 1, referring to step 14a. Optionally, if uplink data packets received by the base station 1 include an uplink data packet ciphered by using the key of the base station 2, the base station 1 forwards the uplink data packet ciphered by using the key of the base station 2, to the base station 2, referring to step 14b. Herein, the forwarding of a ciphered data packet does not change a sequence number of the data packet.

Step 15a and step 15b: Optionally, the base station 1 may decipher, by using the key of the base station 1, the uplink data packet forwarded by the base station 2, referring to step 15a. Optionally, the base station 2 may decipher, by using the key of the base station 2, the uplink data packet forwarded by the base station 1, referring to step 15b.

In some optional embodiments, step 3 and step 4 may alternatively be performed by the base station 2. That is, the base station 2 (the secondary base station) sets the hole, and indicates the "hole".

It should be noted that, not limited to being applicable to the bearer reconfiguration scenario of the bearer type change from the MCG split bearer to the SCG split bearer, the embodiment in FIG. 10A and FIG. 10B is also applicable to a bearer reconfiguration scenario of a bearer type change in another form. The embodiment in FIG. 10A and FIG. 10B is further applicable to a bearer reconfiguration scenario in another form, provided that the PDCP entity of the bearer is migrated to a new base station.

It is assumed that in the bearer reconfiguration scenario of the embodiment in FIG. 10A and FIG. 10B, the bearer type is changed from the MCG bearer to the SCG bearer. A data packet of the MCG bearer can be transmitted through only a serving cell served by the master base station, and a data packet of the SCG bearer can be transmitted through only a serving cell served by the secondary base station. Therefore, in the uplink transmission process, a "hole" does not need to be set on the terminal side, the terminal side may directly send the uplink data packet ciphered by using the key of the base station 1, to the base station 1, and directly send the uplink data packet ciphered by using the key of the base station 2, to the base station 2, so that uplink transmission after the key of the bearer is updated may be completed.

It should be noted that, not limited to a time sequence shown in FIG. 10A and FIG. 10B, when the indication information reaches the terminal, the terminal may have not generated the new key. Even, when the indication information reaches the terminal, the RRC reconfiguration message may have not reached the terminal. That is, step 2 may occur after step 4. For the two situations, the terminal may decipher the data packet based on the indication information after the new key is generated.

Optionally, when the indication information reaches the terminal before the RRC reconfiguration message, a timer may be set, and the received data packet that needs to be ciphered by using the new key is buffered first. If the terminal receives the RRC reconfiguration message before the timer times out, the terminal generates a new key to decipher the data packet; otherwise, the terminal performs processing based on a failure, and returns a failure result to the base station.

It should be noted that, not limited to the time sequence shown in FIG. 10A and FIG. 10B, the uplink transmission process may occur before the downlink transmission process, or the uplink transmission process and the downlink transmission process may occur at the same time.

It may be understood that, in the scenario 2, when the bearer reconfiguration occurs, the sending party sets a "hole" and indicates a sequence number corresponding to the "hole", so that a data packet reaching the receiving party can be correctly deciphered by the receiving party, and it can be ensured that data transmission is continuous and not interrupted.

Figure 11A:
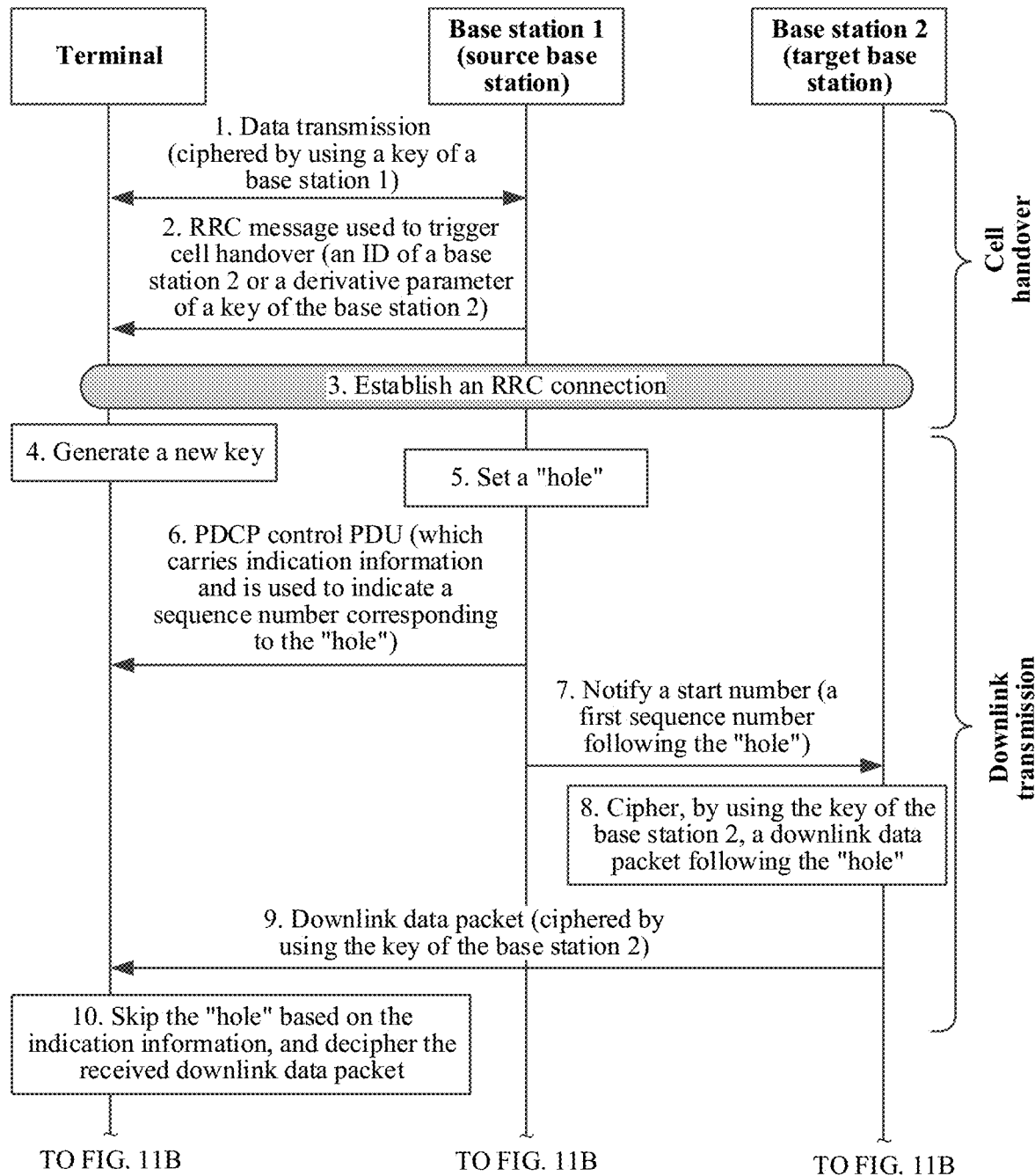
FIG. 11A and FIG. 11B are a schematic flowchart of a communications method according to this application, which is implemented in a cell handover scenario.
Figure 11B:
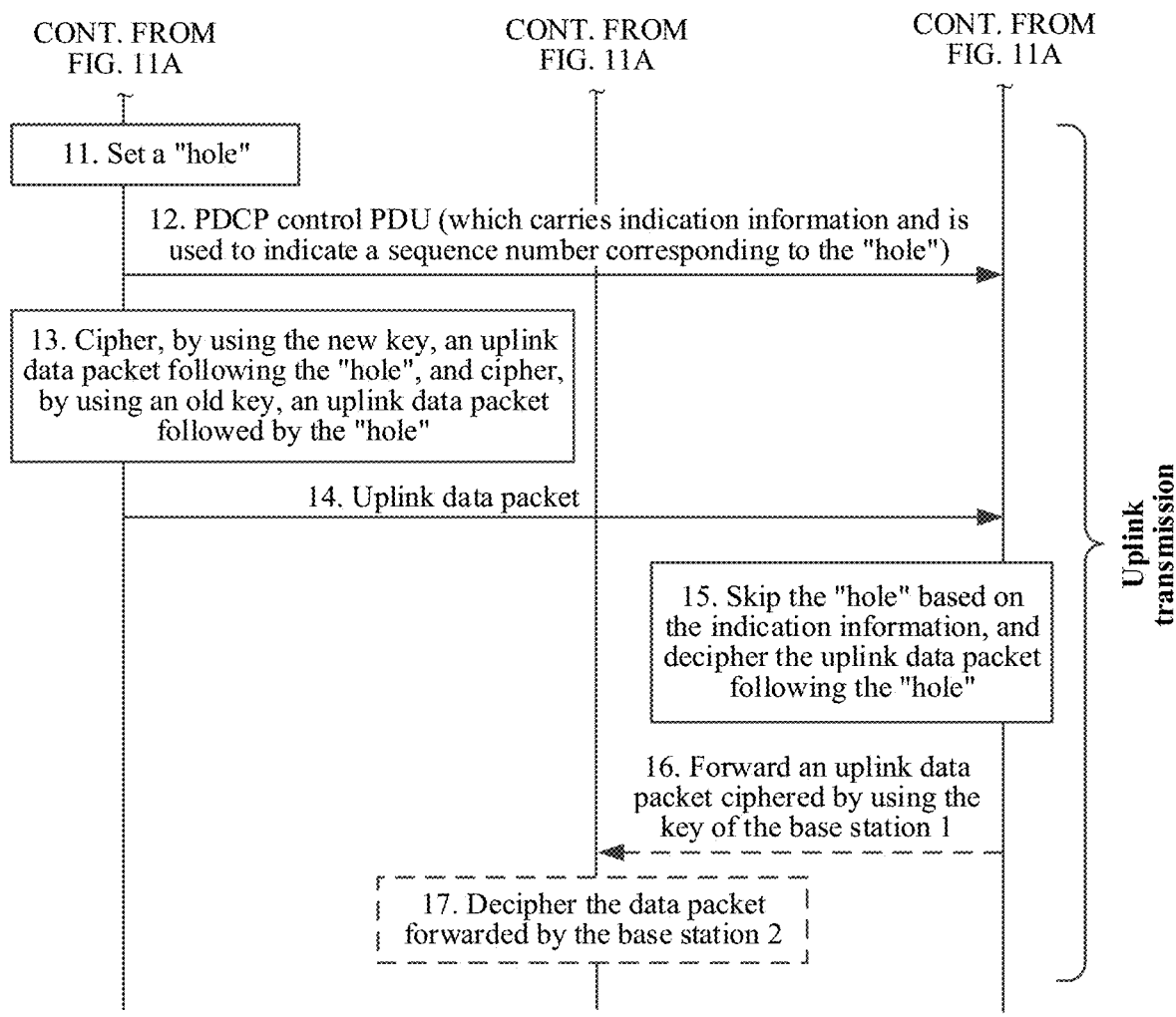

FIG. 11A and FIG. 11B show specific implementation of a communications method provided in this application in the scenario 3. In an embodiment in FIG. 11A and FIG. 11B, a terminal is handed over from a serving cell served by a base station 1 (a source base station) to a serving cell served by a base station 2 (a target base station), that is, inter-base-station cell handover. Correspondingly, a PDCP entity responsible for ciphering and deciphering a data packet of a bearer is also migrated from the base station 1 to the base station 2. It may be understood that, in a downlink transmission process, the target base station or the source base station is the foregoing first device, and the terminal is the foregoing second device. In an uplink transmission process, the terminal is the foregoing first device, and the target base station or the source base station is the foregoing second device. Further description is made below.

(1) Inter-base-station cell handover: refer to step 1 to step 4.

Step 1: Before the handover, the terminal performs data transmission with the base station 1. A data packet transmitted between the terminal and the base station 1 is ciphered by using a key of the base station 1.

Step 2: The base station 1 sends an RRC message used to trigger cell handover, to the terminal. Specifically, the RRC message used to trigger cell handover may carry an identifier of a target cell and a derivative parameter of a key of the base station 2.

Step 3: Establish an RRC connection between the terminal and the base station 2. For a process of establishing an RRC connection, refer to a related process in LTE. Change in a process of establishing an RRC connection in a future communications technology may occur, but does not affect the implementation of this embodiment.

Step 4: After receiving the RRC message used to trigger cell handover, the terminal may generate a new key (that is, the key of the base station 2).

(2) In a downlink transmission process, a key of the bearer is updated. Refer to step 5 to step 10.

Step 5: The base station 1 sets a "hole". For the "hole", refer to the foregoing content, and details are not described herein.

Step 6: The base station 1 sends a PDCP control PDU carrying indication information, to the terminal, to indicate a sequencer number corresponding to the "hole". For implementation of the indication information, refer to the foregoing content, and details are not described herein.

Step 7: The base station 1 sends a start number to the base station 2, to instruct the base station 2 to number data packets starting from the start number.

Herein, the start number is a first sequence number following the "hole". For example, assuming that a sequence number of a last data packet ciphered by using a key of the base station 1 is 100 and a sequence number corresponding to the "hole" is 101, the start number is 102. The example is merely used to explain this application, and should not constitute a limitation.

To ensure that transmission on an air interface is not interrupted, before and/or after step 5, the base station 1 may send, to the base station 2, (some of) downlink data packets ciphered by the base station 1 (by using the key of the base station 1) or copies of the downlink data packets, and the base station 2 does not cipher the data packets (the base station 1 has ciphered the data packets), and directly sends the data packets to the terminal. If the data packets are copies, the data packets are transmitted through both the base station 1 and the base station 2, thereby improving transmission reliability. Before the base station 1 is disconnected, the base station 1 sends, to the base station 2, downlink data packets (that are ciphered by the base station 1 and), where the terminal has not determined that the downlink data packets are successfully received, and the base station 2 does not cipher the data packets (the base station 1 has ciphered the data packets) and directly sends the data packets to the terminal, thereby avoiding loss of the data packets.

Step 8: The base station 2 ciphers, by using the key of the base station 2, downlink data packets received from a serving gateway, and numbers the downlink data packets starting from the start number.

Step 9: The base station 2 sends a downlink data packet ciphered by using the key of the base station 2, to the terminal.

Step 10: The terminal may skip a "hole" based on the indication information, decipher, by using a new key (that is, a key of the base station 2), a downlink data packet following the "hole", and decipher, by using an old key (that is, a key of the base station 1), a downlink data packet followed by the "hole".

(3) In an uplink transmission process, the key of the bearer is updated. Refer to step 11 to step 17.

Step 11: The terminal may set a "hole".

Step 12: The terminal may send a PDCP control PDU carrying indication information, to each of the base station 1 and the base station 2, to indicate a sequencer number corresponding to the "hole".

Step 13: The terminal may cipher, by using the new key (that is, the key of the base station 2), an uplink data packet following the "hole", and cipher, by using the old key (that is, the key of the base station 1), an uplink data packet followed by the "hole".

Step 14: The terminal may send an uplink data packet to the base station 2. Specifically, uplink data packets sent by the terminal to the base station 2 may include an uplink data packet ciphered by using the key of the base station 2, and may include an uplink data packet ciphered by using the key of the base station 1.

Step 15: The base station 2 may skip the "hole" based on the indication information, and decipher a data packet following the "hole" by using the key of the base station 2.

Step 16: Optionally, if uplink data packets received by the base station 2 include an uplink data packet ciphered by using the key of the base station 1, the base station 2 forwards the uplink data packet ciphered by using the key of the base station 1, to the base station 1, so that it can be ensured that all ciphered uplink data packets can be correctly deciphered. Herein, the forwarding of a ciphered data packet does not change a sequence number of the data packet.

Step 17: Optionally, the base station 1 may decipher, by using the key of the base station 1, the uplink data packet forwarded by the base station 2.

It should be noted that, not limited to a time sequence shown in FIG. 11A and FIG. 11B, when the indication information reaches the terminal, the terminal may have not generated the new key. That is, step 4 may occur after step 6. Even, when the indication information reaches the terminal, the RRC message used to trigger cell handover may have not reached the terminal. That is, step 2 may occur after step 6. For the two situations, the terminal may decipher the data packet based on the indication information after the new key is generated.

Optionally, when the indication information reaches the terminal before the RRC message used to trigger cell handover, a timer may be set, and the received data packet that needs to be ciphered by using the new key is buffered first. If the terminal receives the RRC message used to trigger cell handover before the timer times out, the terminal generates a new key to decipher the data packet; otherwise, the terminal performs processing based on a failure, and returns a failure result to the base station.

It should be noted that, not limited to the time sequence shown in FIG. 11A and FIG. 11B, the uplink transmission process may occur before the downlink transmission process, or the uplink transmission process and the downlink transmission process may occur at the same time.

It should be noted that, the embodiment in FIG. 11A and FIG. 11B is also applicable to an intra-base-station cell handover scenario, and in this case, the base station 1 and the base station 2 are a same base station. Correspondingly, signaling exchange between the two base stations in FIG. 11A and FIG. 11B is not required.

It may be understood that, in the scenario 3, when cell handover occurs, the sending party sets a "hole" and indicates a sequence number corresponding to the "hole", so that a data packet reaching the receiving party can be correctly deciphered by the receiving party, and it can be ensured that data transmission is continuous and not interrupted.

Figure 12:
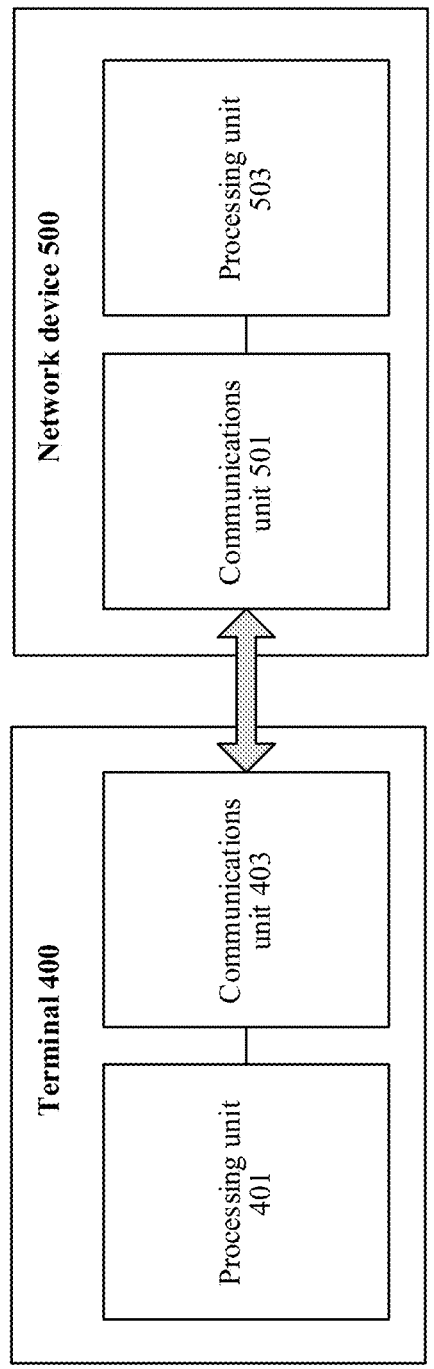
FIG. 12 is a functional block diagram of a wireless communications system, a terminal, and a network device according to this application.

FIG. 12 shows a wireless communications system, a terminal, and a network device provided in this application. The wireless communications system 10 includes the terminal 400 and the network device 500. The terminal 400 may be a terminal 200 in an embodiment in FIG. 5, the network device 500 may be a network device 300 in an embodiment in FIG. 6, and the wireless communications system 10 may be a wireless communications system 100 described in FIG. 2 or FIG. 3. Descriptions are made below separately.

As shown in FIG. 12, the terminal 400 may include a processing unit 401 and a communications unit 403.

When a key used by a bearer is updated in a downlink transmission process:

the communications unit 403 may be configured to receive indication information sent by the network device 500 when the key used by the bearer is updated, where the indication information is used to indicate at least one intermediate sequence number between a sequence number of a first data packet located on the bearer and ciphered by using a new key and a sequence number of a last data packet located on the bearer and ciphered by using an old key, and the sequence number of the first data packet located on the bearer and ciphered by using the new key and the sequence number of the last data packet located on the bearer and ciphered by using the old key are discontinuous; the communications unit 403 may be further configured to receive a data packet of the bearer sent by the network device 5oo; and the processing unit 401 may be configured to skip the at least one intermediate sequence number based on the indication information, decipher, by using the old key, a data packet that is located on the bearer and whose sequence number is followed by the at least one intermediate sequence number, and decipher, by using the new key, a data packet that is located on the bearer and whose sequence number follows the at least one intermediate sequence number.

When the key used by the bearer is updated in an uplink transmission process: the communications unit 403 may be configured to send indication information to the network device 500 when the key used by the bearer is updated, where the indication information is used to indicate at least one intermediate sequence number between a sequence number of a first data packet located on the bearer and ciphered by using a new key and a sequence number of a last data packet located on the bearer and ciphered by using an old key, and the sequence number of the first data packet located on the bearer and ciphered by using the new key and the sequence number of the last data packet located on the bearer and ciphered by using the old key are discontinuous.

For the definition and the descriptions of the "hole", the indication information, and specific implementation of skipping the "hole", refer to the foregoing method embodiments, and details are not described herein.

Specifically, the terminal 400 may be implemented through the terminal 200 shown in FIG. 5, where the communications unit 403 may be implemented through a transmitter 206 and a receiver 205 in the terminal 200, and the processing unit 401 may be implemented through a terminal processor 201 in the terminal 200.

It may be understood that, for specific implementation of functional units included in the terminal 400, refer to the foregoing method embodiments, and details are not described herein.

As shown in FIG. 12, the network device 500 may include: a communications unit 501 and a processing unit 503.

When the key used by the bearer is updated in the uplink transmission process: the communications unit 501 may be configured to receive indication information sent by the terminal 400 when the key used by the bearer is updated, where the indication information is used to indicate at least one intermediate sequence number between a sequence number of a first data packet located on the bearer and ciphered by using a new key and a sequence number of a last data packet located on the bearer and ciphered by using an old key, and the sequence number of the first data packet located on the bearer and ciphered by using the new key and the sequence number of the last data packet located on the bearer and ciphered by using the old key are discontinuous; the communications unit 501 may be further configured to receive a data packet of the bearer sent by the terminal 400; and the processing unit 503 may be configured to skip the at least one intermediate sequence number based on the indication information, decipher, by using the old key, a data packet that is located on the bearer and whose sequence number is followed by the at least one intermediate sequence number, and decipher, by using the new key, a data packet that is located on the bearer and whose sequence number follows the at least one intermediate sequence number.

When the key used by the bearer is updated in the downlink transmission process: the communications unit 501 may be configured to send indication information to the terminal 400 when the key used by the bearer is updated, where the indication information is used to indicate at least one intermediate sequence number between a sequence number of a first data packet located on the bearer and ciphered by using a new key and a sequence number of a last data packet located on the bearer and ciphered by using an old key, and the sequence number of the first data packet located on the bearer and ciphered by using the new key and the sequence number of the last data packet located on the bearer and ciphered by using the old key are discontinuous.

For the definition and the descriptions of the "hole", the indication information, and specific implementation of skipping the "hole", refer to the foregoing method embodiments, and details are not described herein.

Specifically, the network device 500 may be implemented through the network device 300 shown in FIG. 6, where the communications unit 501 may be implemented through a transmitter 305 and a receiver 306 in the network device 300, and the processing unit 501 may be implemented through a network device processor 301 in the network device 300.

It may be understood that, for specific implementation of functional units included in the network device 500, refer to the foregoing embodiments, and details are not described herein.

To sum up, by implementing the embodiments of this application, when the key used by the bearer is updated, the sending party sets the "hole" by using the feature of sequential submission at the PDCP layer, and sends the indication information to the receiving party to indicate the sequence number corresponding to the "hole". In this way, the receiving party may skip the "hole" based on the indication information, decipher, by using the new key, the data packet following the "hole", and decipher, by using the old key, the data packet followed by the "hole". In this way, the data packet may be correctly deciphered, the problem of key confusion in a period is effectively resolved, and it is ensured that data transmission is not interrupted.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A method, comprising:
    receiving, by an apparatus, indication information from a first device, wherein the indication information indicates at least one intermediate sequence number between a sequence number of a first data packet and a sequence number of a last data packet, wherein the first data packet is located on a bearer and ciphered using a new key, the last data packet is located on the bearer and ciphered using an old key, and the sequence number of the first data packet and the sequence number of the last data packet are discontinuous;
    skipping, by the apparatus, each intermediate sequence number of the at least one intermediate sequence number based on the indication information;
    deciphering, by the apparatus using the old key, a data packet that is located on the bearer and whose sequence number is followed by a first intermediate sequence number of the at least one intermediate sequence number; and
    deciphering, by the apparatus using the new key, a data packet that is located on the bearer and whose sequence number follows a last intermediate sequence number of the at least one intermediate sequence number.

2. The method according to claim 1, wherein skipping each intermediate sequence number of the at least one intermediate sequence number based on the indication information, deciphering, using the old key, the data packet that is located on the bearer and whose sequence number is followed by a first intermediate sequence number of the intermediate sequence number, and deciphering, using the new key, the data packet that is located on the bearer and whose sequence number follows a last intermediate sequence number of the intermediate sequence number comprises:
    in response to the indication information comprising a sequence number y of the first data packet ciphered using the new key, skipping a sequence number y−1 to a sequence number y−n, deciphering a data packet whose sequence number is greater than or equal to y using the new key, and deciphering a data packet whose sequence number is less than or equal to y−n−1 using the old key; or in response to the indication information comprising a sequence number x of the last data packet ciphered using the old key, skipping a sequence number x+1 to a sequence number x+n, deciphering a data packet whose sequence number is greater than or equal to x+n+1 using the new key, and deciphering a data packet whose sequence number is less than or equal to x using the old key; or in response to the indication information comprising a range [a, b] of intermediate sequence numbers of the at least one intermediate sequence number, skipping the range [a, b], deciphering a data packet whose sequence number is greater than b using the new key, and deciphering a data packet whose sequence number is less than a using the old key; and wherein n is a quantity of intermediate sequence numbers of the at least one intermediate sequence number, n is greater than or equal to 1, and x, y, a, and b are positive integers.

3. The method according to claim 1, wherein skipping each intermediate sequence number of the at least one intermediate sequence number comprises:

using the first data packet ciphered using the new key as a next data packet of the last data packet ciphered using the old key, and after the next data packet of the last data packet is deciphered, submitting the next data packet of the last data packet to an upper layer.

4. The method according to claim 1, wherein deciphering, using the old key, the data packet whose sequence number is followed by the first intermediate sequence number of the at least one intermediate sequence number, and deciphering, using the new key, the data packet whose sequence number follows the last intermediate sequence number of the at least one intermediate sequence number comprises:

determining, based on the indication information, whether the data packet deciphered using the new key has been correctly deciphered; and in response to determining that the data packet deciphered using the new key is incorrectly deciphered, re-deciphering the incorrectly deciphered data packet using the old key.

5. The method according to claim 1, wherein deciphering, using the old key, the data packet that is located on the bearer and whose sequence number is followed by the first intermediate sequence number of the at least one intermediate sequence number, and deciphering, using the new key, the data packet that is located on the bearer and whose sequence number follows the last intermediate sequence number of the at least one intermediate sequence number comprises:

determining, based on the indication information, whether the data packet deciphered using the old key has been correctly deciphered; and in response to determining that the data packet is incorrectly deciphered, re-deciphering the incorrectly deciphered data packet using the new key.

6. The method according to claim 1, wherein keys of a plurality of bearers are updated, and receiving the indication information sent by the first device comprises:

receiving a piece of signaling sent by the first device, wherein the piece of signaling carries the indication information and bearer identifiers respectively corresponding to the plurality of bearers; or receiving a plurality of pieces of signaling sent by the first device, wherein each piece of signaling of the plurality of pieces of signaling carries respective indication information corresponding to a bearer of the plurality of bearers.

7. The method according to claim 1, wherein receiving the indication information from the first device comprises:

in response to a key of a serving base station corresponding to the bearer changing, receiving the indication information from the first device;

in response to a cell corresponding to the bearer being handed over, receiving the indication information from the first device; or in response to the bearer being reconfigured, receiving the indication information from the first device.

8. The method according to claim 1, wherein the indication information comprises:

the sequence number of the first data packet ciphered using the new key, the sequence number of the last data packet ciphered using the old key, or information about a sequence number between the sequence number of the first data packet ciphered using the new key and the sequence number of the last data packet ciphered using the old key.

9. The method according to claim 8 wherein the indication information further comprises a quantity of intermediate sequence numbers comprised in the at least one intermediate sequence number.

10. The method according to claim 1, wherein the indication information is carried in radio resource control (RRC) signaling or a packet data convergence protocol (PDCP) control protocol data unit.

11. A method, comprising:

setting, by an apparatus, a sequence number of a first data packet and a sequence number of a last data packet to be discontinuous, wherein the first data packet is located on a bearer and ciphered using a new key and the last data packet is located on the bearer and ciphered using an old key; and sending, by the apparatus, indication information to a second device, wherein the indication information indicates at least one intermediate sequence number to skip from deciphering, and the at least one intermediate sequence number is between the sequence number of the first data packet and the sequence number of the last data packet.

12. The method according to claim 11, wherein keys of a plurality of bearers are updated, and sending the indication information to the second device comprises:

sending a piece of signaling to the second device, wherein the piece of signaling carries the indication information and bearer identifiers respectively corresponding to the plurality of bearers; or sending a plurality of pieces of signaling to the second device, wherein each piece of signaling of the plurality of pieces of signaling carries respective the indication information corresponding to a bearer of the plurality of bearers.

13. The method according to claim 11, wherein sending the indication information to the second device comprises:

in response to a key of a serving base station corresponding to the bearer being changed, sending the indication information to the second device;

in response to a cell corresponding to the bearer being handed over, sending the indication information to the second device; or in response to the bearer being reconfigured, sending the indication information to the second device.

14. The method according to claim 11, wherein the indication information comprises:
the sequence number of the first data packet ciphered using the new key, the sequence number of the last data packet ciphered using the old key, or information about a sequence number between the sequence number of the first data packet ciphered using the new key and the sequence number of the last data packet ciphered using the old key.

15. The method according to claim 14, wherein the indication information further comprises a quantity of intermediate sequence numbers comprised in the at least one intermediate sequence number.

16. The method according to claim 11, wherein the indication information is carried in radio resource control (RRC) signaling or a packet data convergence protocol (PDCP) control protocol data unit.

17. An apparatus, comprising:
a receiver;
a processor; and
a non-transitory computer-readable storage medium storing a program to be executed by the processor, the program including instructions for:
receiving, using the receiver, indication information sent by a first device, wherein the indication information indicates at least one intermediate sequence number between a sequence number of a first data packet and a sequence number of last data packet, wherein the first data packet is located on a bearer and ciphered using a new key, and the last data packet is located on the bearer and ciphered using an old key, and the sequence number of the first data packet and the sequence number of the last data packet are discontinuous; and
skipping each intermediate sequence number of the at least one intermediate sequence number based on the indication information;
deciphering, using the old key, a data packet that is located on the bearer and whose sequence number is followed by a first intermediate sequence number of the at least one intermediate sequence number; and
deciphering, using the new key, a data packet that is located on the bearer and whose sequence number follows a last intermediate sequence number of the at least one intermediate sequence number.

18. The apparatus according to claim 17, wherein the program includes instructions for:
in response to the indication information comprising a sequence number y of the first data packet ciphered using the new key, skipping a sequence number y−1 to a sequence number y−n, deciphering a data packet whose sequence number is greater than or equal to y using the new key, and deciphering a data packet whose sequence number is less than or equal to y−n−1 using the old key; or
in response to the indication information comprising a sequence number x of the last data packet ciphered using the old key, skipping a sequence number x+1 to a sequence number x+n, deciphering a data packet whose sequence number is greater than or equal to x+n+1 using the new key, and deciphering a data packet whose sequence number is less than or equal to x using the old key; or
in response to the indication information comprising a range [a, b] of intermediate sequence numbers of the at least one intermediate sequence number, skipping the range [a, b], deciphering a data packet whose sequence number is greater than b using the new key, and deciphering a data packet whose sequence number is less than a using the old key; and
wherein n is a quantity of intermediate sequence numbers comprised in the at least one intermediate sequence number, n is greater than or equal to 1, and x, y, a, and b are positive integers.

19. The apparatus according to claim 17, wherein the program includes instructions for:
using the first data packet ciphered using the new key as a next data packet of the last data packet ciphered by using the old key, and after the next data packet of the last data packet is deciphered, submitting the next data packet of the last data packet to an upper layer.

20. The apparatus according to claim 17, wherein the program includes instructions for:
determining, based on the indication information, whether the data packet deciphered using the new key has been correctly deciphered; and
in response to determining that the data packet is incorrectly deciphered, re-deciphering the incorrectly deciphered data packet using the old key.

* * * * *